United States Patent
Talley et al.

(10) Patent No.: US 12,544,356 B2
(45) Date of Patent: Feb. 10, 2026

(54) COMBINATION OF A CHROMENE COMPOUND AND A SECOND ACTIVE AGENT

(71) Applicant: EUCLISES PHARMACEUTICALS, INC., Saint Louis, MO (US)

(72) Inventors: John J. Talley, Saint Louis, MO (US); Bobby W. Sandage, Jr., Creve Coeur, MO (US); Eduardo J. Martinez, Bryn Mawr, PA (US)

(73) Assignee: Euclises Pharmaceuticals, Inc., Saint Louis, MO (US)

( * ) Notice: Subject to any disclaimer, the term of this patent is extended or adjusted under 35 U.S.C. 154(b) by 0 days.

(21) Appl. No.: 17/744,185

(22) Filed: May 13, 2022

(65) Prior Publication Data

US 2022/0265602 A1 Aug. 25, 2022

Related U.S. Application Data

(62) Division of application No. 15/401,777, filed on Jan. 9, 2017, now abandoned.

(60) Provisional application No. 62/277,225, filed on Jan. 11, 2016, provisional application No. 62/276,713, filed on Jan. 8, 2016.

(51) Int. Cl.
| | | |
|---|---|---|
| *A61K 31/352* | (2006.01) | |
| *A61K 31/517* | (2006.01) | |
| *A61K 39/395* | (2006.01) | |
| *A61K 45/06* | (2006.01) | |
| *A61P 35/00* | (2006.01) | |
| *C07K 16/28* | (2006.01) | |

(52) U.S. Cl.
CPC .......... *A61K 31/352* (2013.01); *A61K 31/517* (2013.01); *A61K 39/3955* (2013.01); *A61K 39/39558* (2013.01); *A61K 45/06* (2013.01); *A61P 35/00* (2018.01); *C07K 16/2818* (2013.01); *C07K 16/2827* (2013.01)

(58) Field of Classification Search
CPC ...... A61K 35/34; A61K 31/70; A61K 31/195; A61K 31/44; A61K 2300/00
See application file for complete search history.

(56) References Cited

U.S. PATENT DOCUMENTS

| | | | |
|---|---|---|---|
| 6,034,256 A | 3/2000 | Carter et al. | |
| 9,371,305 B2 | 6/2016 | Zhang et al. | |
| 2002/0103141 A1 | 8/2002 | McKearn et al. | |
| 2004/0127470 A1 | 7/2004 | Masferrer | |
| 2012/0016002 A1 | 1/2012 | Lawhon et al. | |
| 2014/0099254 A1 | 4/2014 | Chang et al. | |
| 2015/0133538 A1* | 5/2015 | Zhang | A61P 17/08 514/456 |
| 2016/0312297 A1 | 10/2016 | Ayers et al. | |

FOREIGN PATENT DOCUMENTS

| | | |
|---|---|---|
| CN | 102757417 A | 10/2012 |
| CN | 103012350 A | 4/2013 |
| CN | 103044477 A | 4/2013 |
| JP | 2015-519378 A | 7/2015 |
| WO | WO-2003/015608 A2 | 2/2003 |
| WO | WO-2013/189121 A1 | 12/2013 |
| WO | WO-2014/163684 A1 | 10/2014 |

OTHER PUBLICATIONS

Patnaik (Phase I Study of Pembrolizumab (MK-3475; Anti-PD-1 Monoclonal Antibody) in Patients with Advanced Solid Tumors, Clin Cancer Res; 21(19) Oct. 1, 2015, pp. 4286-4293).*
Bezawada (Urinary PGE-M levels are associated with risk of colorectal adenomas and chemopreventive response to antiinflammatory drugs, Cancer Prev Res (Phila). Jul. 2014 ; 7(7): 758-765).*
Gutenberg et al (Eur J Med Chem 36:109-126, 2001) (Year: 2001).*
Johnson et al (Clin Gastroenterol and Hepatology 4:1358-1365, 2006) (Year: 2006).*
Le et al (N Engl J Med 372:2509-2520, 2015) (Year: 2015).*
Extended European Search Report from corresponding European Patent Application No. 17736519.4, dated Aug. 20, 2019.
Dhawan et al., Cyclooxygenase-2 dependent and independent antitumor effects inducted by celecoxib in urinary bladder cancer cells, 2008, Mol Cancer Ther, vol. 7(4), pp. 897-904.
Baras et al., (2016). "The ratio of CD8 to Treg tumor-infiltrating lymphocytes is associated with response to cisplatin-based neoadjuvant chemotherapy in patients with muscle invasive urothelial carcinoma of the bladder". Oncoimmunology 5(5):1-7.
Bupathi, et al., (2016). "Biomarkers for immune therapy in colorectal cancer: mismatchrepair deficiency and others". *J. Gastrointest. Oncol.* 7(5):713-720.

(Continued)

*Primary Examiner* — Craig D Ricci
(74) *Attorney, Agent, or Firm* — Harness, Dickey & Pierce, P.L.C.

(57) ABSTRACT

The present disclosure provide a combination of a chromene compound having the structure of Formula (I), or pharmaceutically acceptable salts, and a second compound that can be selected from a PD-1 inhibitor, PD-L1 inhibitor, CTLA-4 inhibitor, OX-40 agonist, CD137 agonist, LAG-3 inhibitor, IDO inhibitor, bi-specific protein, EGFR inhibitor, HER2 inhibitor, and immune stimulating therapy and a method of using the combination for treating or preventing cancer.

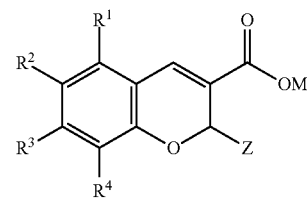

8 Claims, 4 Drawing Sheets

(56) References Cited

OTHER PUBLICATIONS

Dudley, et al. (2016) "Microsatellite Instability as a Biomarker for PD-1 Blockade". *Clin Cancer Res.* Feb. 15;22(4):813-20.

Kautto, et al., (2017). "Performance evaluation for rapid detection of pan-cancer microsatellite instability with MANTIS." Clin Cancer Res.Oncotarget 8(5)7452:7463.

Koguchi, et al., (2015). "Serum Immunoregulatory Proteins as Predictors of Overall Survival of Metastatic Melanoma Patients Treated with Ipilimumab". *Cancer Res.* 75(23):5084-92.

Preston et al., (2013). "The ratios of CD8+ T cells to CD4+CD25+ Foxp3+ and Foxp3− T cells correlate with poor clinical outcome in human serous ovarian cancer." *PLoS One.* 8(11):1-10.

Prima et al. (2017) "COX2/mPGES1/PGE2 pathway regulates PD-L1 expression in tumor-associated macrophages and myeloid-derived suppressor cells." *Proc Natl Acad Sci USA.;* 114(5):1117-1122.

Salgado, et al., (2015). "The evaluation of tumor-infiltrating lymphocytes (TILS) in breast cancer: recommendations by an international tilsworking group 2014". *Ann Oncol* 26:259-271.

Simpson et al., (2010). "intratumoral T cell infiltration, MHC class I and Stat1 as biomarkers of good prognosis in colorectal cancer". *Gut* 59:926-933.

Sinicrope, et al., (2016). "Molecular Biomarkers in the Personalized Treatment of Colorectal Cancer". *Clin Gastroenterol Hepatol.* 14(5):651-8.

Vilar et al., (2010). "Microsatellite instability in colorectal cancer— the stable evidence". *Nat. Rev. Clin. Oncol.,* 7(3):153-162.

Wang et al., (2013). "Urinary PGE-M: a promising cancer biomarker". *Cancer Prev. Res.* pp. 507-510.

Zhang, et al., (2015). "Synthesis and Evaluation of Novel Erlotinib-NSAID Conjugates as More Comprehensive Anticancer Agents". *ACS Med. Chem. Lett.* 6:1086-1090.

Zhang, et al., (2014). "Synthesis of Deuterated Benzopyran Derivatives as Selective COX-2 Inhibitors with Improved Pharmacokinetic Properties". *ACS Med Chem Lett.* 5: 1162-1166.

Li, Z., et al.; "Recent updates in cancer immunotherapy: a comprehensive review and perspective of the 2018 China Cancer Immunotherapy Workshop in Beijing", Journal of Hematology & Oncology, 11: 142, 2018, pp. 1-15.

Office Action from corresponding Mexican Patent Application No. MX/a/2018/008433, dated Sep. 3, 2020.

Office Action from corresponding Japanese Patent Application No. JP 2018-554651, dated Nov. 10, 2020, with English translation.

Office Action (Non-Final) from corresponding U.S. Appl. No. 15/401,777, dated Apr. 11, 2018.

Office Action (Final) from corresponding U.S. Appl. No. 15/401,777, dated Nov. 22, 2019.

Office Action (Non-Final) from corresponding U.S. Appl. No. 15/401,777, dated Apr. 29, 2020.

Buchanan, F. G., et al.; "Targeting Cyclooxygenase-2 and the Epidermal Growth Factor Receptor for the Prevention and Treatment of Intestinal Cancer", Cancer Res 2007; 67: (19). Oct. 1, 2007, pp. 9380-9388.

Office Action from corresponding Korean Patent Application No. 10-2018-7022783, dated Jun. 11, 2024.

\* cited by examiner

COMBINATION OF A CHROMENE COMPOUND AND A SECOND ACTIVE AGENT

CROSS-REFERENCE TO RELATED APPLICATIONS

This application is a divisional application of U.S. application Ser. No. 15/401,777, filed on 9 Jan. 2017, which claims benefit under 35 U.S.C. § 119(e) of U.S. Application Ser. No. 62/276,713 filed on Jan. 8, 2016 and U.S. Application Ser. No. 62/277,225 filed on Jan. 11, 2016. The contents of which are incorporated by reference in their entirety.

FIELD

The present disclosure generally relates to combinations of a chromene compound and a second compound for pharmaceutical use, pharmaceutical compositions comprising the combination and methods useful for treating a subject by administering the combination. More specifically, the present disclosure relates to a combination comprising a class of deuterated and non-deuterated chromene compounds and a second active compound, and methods for preventing and treating various cancers.

BACKGROUND

This section provides background information related to the present disclosure which is not necessarily prior art.

Non-steroidal anti-inflammatory drugs (NSAIDs) have been demonstrated to treat and prevent various cancers. Nonselective NSAIDs inhibit both COX-1 and COX-2. COX-2 contributes to carcinogenesis by increasing production of prostaglandins, inhibiting apoptosis, promoting angiogenesis, and modulating inflammation and immune function. COX-2 inhibitors can be effective treatments for various cancers.

Some selective COX-2 inhibitors comprise a chromene structural feature. Chromene-based COX-2 inhibitors have similar selectivity and antinociceptive capacity as diarylheterocyclic coxib compounds. However, chromene-based COX-2 inhibitors do not damage the kidneys, unlike the diarylheterocyclic coxib-based drugs, thereby reducing the possibility of hypertension.

Urinary PGE-M is a major urinary metabolite of PGE2 and can be used as an index of systemic PGE2 production. PGE-M levels are suppressed by both nonselective NSAIDs and COX-2 selective inhibitors. Given that the antitumor effects of NSAIDs (such as COX-2 inhibitors) depend on reduction of PGE2 production via targeting COX-2, urinary PGE-M serves as a valuable intermediate marker for the pharmacologic activity of NSAIDs in cancer prevention and treatment. PGE-M is a useful biomarker for predicting efficacy of COX-2 inhibitors in patients with cancers dependent upon COX-2 overexpression (Wang, et al., *Cancer Prev. Res.*, 2013).

WO 03/015608 describes methods of treating or preventing cancer using a protein kinase inhibitor, which may be combined with a COX-2 inhibitor.

US 2004/0127470 describes a method for treating neoplasia disorders with a combination of a COX-2 inhibitor and an EGFR antagonist.

WO 2013/189121 reports novel deuterated benzopyran compounds having anti-inflammatory and anti-tumor effects.

Zhang, et al. (*ACS Med. Chem. Lett.* 2015) describe a method for treating lung cancer, in vitro, with a covalent attachment of erlotinib to different NSAIDs.

SUMMARY

This section provides a general summary of the disclosure, and is not a comprehensive disclosure of its full scope or all of its features.

There is provided a combination of a compound of Formula (I), or a pharmaceutically acceptable salt or solvate thereof, and a second compound, wherein Formula (I) is

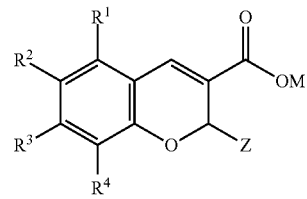

wherein M is selected from the group consisting of H and alkyl;

Z is selected from the group consisting of $CF_3$, $CF_2H$ and $C_2F_5$;

each of $R^1$, $R^2$, $R^3$, and $R^4$ is independently selected from a group consisting of H, alkyl, aralkyl, deuteroalkyl, deuteroaralkyl, deuteroalkoxy, deuterocycloalkyl, deuteron, deuteriumaryloxy, deuteroaryloxy, deuteroheteroaryloxy, deuteroarylalkoxy, deuteroheteroarylalkoxy, deuterohaloalkoxy, deuterohaloalkoxy, deuteroamino, deuterosulfamidyl, sulfamidyl, cycloalkyl, cycloalkenyl, halo, haloalkyl, alkoxy, haloalkoxy, alkylthio, haloalkylthio, pentafluorosulfanyl, hydroxyalkyl, trialkylsilyl, alkynyl, and alkenyl; and wherein the second compound is selected from the group consisting of PD-1 inhibitors, PD-L1 inhibitors, CTLA-4 inhibitors, OX-40 agonists, CD137 agonists, LAG-3 inhibitors, IDO inhibitors, bi-specific proteins, EGFR inhibitors, HER2 inhibitors, and immune stimulating therapies.

In another embodiment, there is provided a pharmaceutical composition comprising a therapeutically effective amount of a combination of a compound of Formula (II) and a second compound.

In another embodiment, there is provided a method for treating cancer comprising administering to a subject in need thereof a therapeutically effective amount of a combination of a compound of Formula (I) and a second compound.

DETAILED DESCRIPTION

A. Definitions

Figure 1:
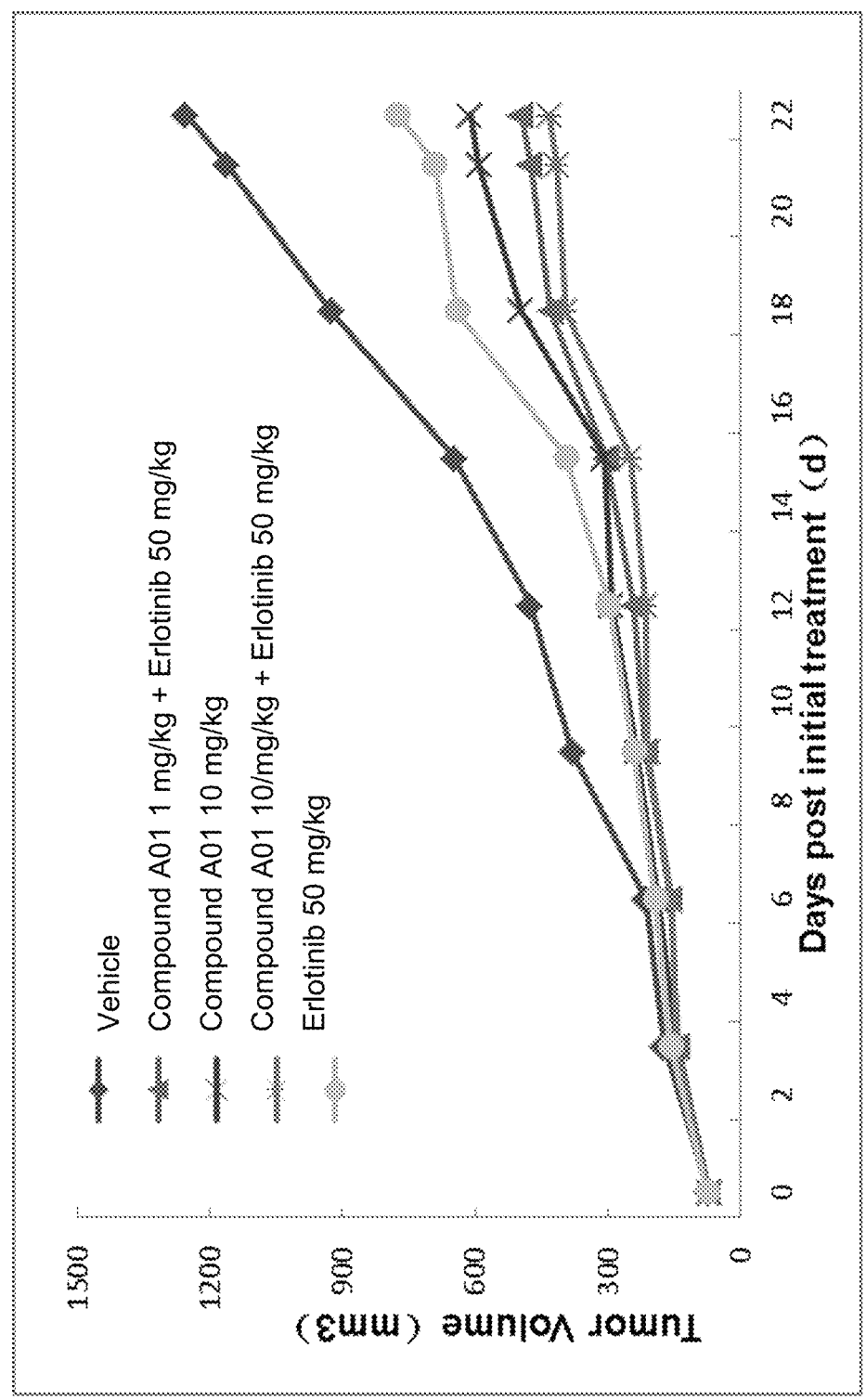
FIG. 1 shows effect of Compound A01, erlotinib, or a combination thereof on tumor volumes ($mm^3$) in mice inoculated with colorectal cancer cells.

The term "deuterium" as used herein is intended to mean a single deuterium atom, where the deuterium radicals are attached to carbon to form deuterated compounds.

As used herein, the terms "alkyl" and "alkylene" refers to branched and straight-chain saturated aliphatic hydrocarbon groups having the specified number of carbon atoms. For example, "$C_1$-$C_5$" as in "$C_1$-$C_5$ alkyl" is defined to include groups having 1, 2, 3, 4 or 5 carbon atoms in a linear or branched arrangement. For example, "$C_1$-$C_5$ alkyl" specifically includes methyl, ethyl, n-propyl, isopropyl, n-butyl, tert-butyl, isobutyl, pentyl, etc.

The term "cycloalkyl" means a monocyclic saturated aliphatic hydrocarbon group having the specified number of carbon atoms. For example, "cycloalkyl" includes cyclopropyl, methyl-cyclopropyl, 2,2-dimethyl-cyclobutyl, 2-ethyl-cyclopentyl, and cyclohexyl.

As used herein, the terms "alkenyl" and "alkenylene" refers to branched and straight-chained unsaturated or partially unsaturated hydrocarbon groups having the specified number of carbons and at least one carbon-to-carbon double bond. The term "cycloalkenyl" means a monocyclic unsaturated or partially unsaturated aliphatic hydrocarbon group having the specified number of carbon atoms and at least one carbon-to-carbon double bond.

As used herein, the terms "alkynyl" and "alkynylene" refers to branched and straight-chained unsaturated or partially unsaturated hydrocarbon groups having the specified number of carbons and at least one carbon-to-carbon triple bond.

The term "alkoxy" as used herein represents either a cyclic or non-cyclic alkyl group of indicated number of carbon atoms attached through an oxygen bridge. "Alkoxy" therefore encompasses the definitions of alkyl and cycloalkyl above.

The term "aryl" as used herein is intended to mean any stable monocyclic or bicyclic carbon ring of up to 7 atoms in each ring, wherein at least one ring is aromatic. Examples of such aryl elements include phenyl, naphthyl, tetrahydronaphthyl, indanyl and biphenyl.

The term "heteroaryl" as used herein represents a stable monocyclic or bicyclic ring of up to 7 atoms in each ring, wherein at least one ring is aromatic and contains from 1 to 4 heteroatoms selected from the group consisting of O, N and S. Heteroaryl groups within the scope of this definition include but are not limited to: acridinyl, carbazolyl, cinnolinyl, quinoxalinyl, pyrrazolyl, indolyl, benzotriazolyl, furyl, thienyl, benzothiophenyl, benzofuryl, quinolyl, isoquinolyl, oxazolyl, isoxazoyl, indolyl, pyrazinyl, pyridazinyl, pyridyl, pyrimidinyl, pyrrolyl and tetrahydroquinoline.

The term "halo" or "halogen" as used herein includes chlorine, fluorine, bromine and iodine.

Included in the present disclosure is the free form of compounds of Formula (I), as well as the pharmaceutically acceptable salts and stereoisomers thereof. Some of the specific compounds exemplified herein are the protonated salts of amine compounds. The term "free form" refers to the chromene compounds in non-salt form. The encompassed pharmaceutically acceptable salts not only include the salts exemplified for the specific compounds described herein, but also all the typical pharmaceutically acceptable salts of the free form of compounds of Formula (I). The free form of the specific salt compounds described may be isolated using techniques known in the art.

The pharmaceutically acceptable salts of the present disclosure may be synthesized from the compounds of the present disclosure which contain a basic or acidic moiety by conventional chemical methods.

When the compound of the present disclosure is acidic, suitable "pharmaceutically acceptable salts" refers to salts prepared from pharmaceutically acceptable non-toxic bases including inorganic bases and organic bases.

It will be noted that the compounds of the present disclosure are potentially internal salts or zwitterions, since under physiological conditions a deprotonated acidic moiety in the compound, such as a carboxyl group, may be anionic, and this electronic charge might then be balanced internally against the cationic charge of a protonated or alkylated basic moiety, such as a quaternary nitrogen atom.

The term "combination" as used herein represents the use of both a chromene compound of Formula (I) or (II) and a second compound as described herein. The combination includes a co-presentation of both compounds such as a kit or a co-packaged product and patient's use of both compounds obtained or prescribed separately. The chromene compound of Formula (I) or (II) of the combination may be administered to the patient prior to, concomitantly with, after, or alternating with the second compound.

Immune checkpoint proteins are integral components of the immune system, which generally can act to stimulate or inhibit immune signals (e.g., the signal for T-cell activation). Non-limiting examples of stimulatory immune checkpoint proteins include CD27, CD40, OX40, GITR, CD137, CD28, HVEM, and ICOS. Non-limiting examples of inhibitory immune checkpoint proteins include the adenosine $A_{2A}$ receptor, B7-H3, B7-H4, BTLA, CTLA-4, IDO, KIR, LAG-3, PD-1, PD-L1, TIM-3, and VISTA (C10orf54).

Immune checkpoint modulating compounds are any compounds, such as antibodies, small molecules, biologics, or polysaccharides, which modulate the action of an immune checkpoint protein. Modulation of the immune checkpoint protein can include action of the compound as an agonist, antagonist, allosteric effector, or any effect resulting from binding to the immune checkpoint protein or protein ligand that modifies the usual biological function of an immune checkpoint protein. Many cancers express high levels of inhibitory immune checkpoint proteins to evade detection by T cells and other immune system components. Blocking inhibitory immune checkpoint proteins, such as PD-1, with an antagonist antibody increases immune response in detecting and destroying cancer cells. Conversely, activating stimulatory immune checkpoint proteins, such as OX-40, with agonist antibodies increases immune response in recognizing and destroying cancer cells.

B. Chromene Compounds

The present disclosure relates to chromene compounds having the structure as shown in Formula (I) or Formula (II). The compounds and pharmaceutically acceptable salts thereof disclosed by the present application can be applied in preparing anti-inflammatory and analgesic drugs and drugs for treating or preventing tumors.

In one embodiment, the present disclosure provides a combination comprising a chromene compound of Formula (I) or a pharmaceutically acceptable salt or solvate thereof and a second compound:

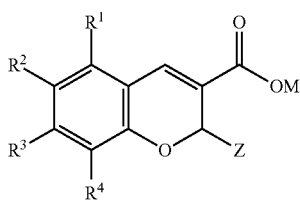

(I)

wherein M is selected from the group consisting of H and alkyl; Z is selected from the group consisting of —CF$_3$, —CF$_2$H and —C$_2$F$_5$; each of R$^1$, R$^2$, R$^3$, and R$^4$ is independently selected from a group consisting of H, alkyl, aralkyl, deuteroalkyl, deuteroaralkyl, deuteroalkoxy, deuterocycloalkyl, deuteron, deuteriumaryloxy, deuteroaryloxy, deuteroheteroaryloxy, deuteroarylalkoxy, deuteroheteroarylalkoxy, deuterohaloalkoxy, deuterohaloalkoxy, deuteroamino, deuterosulfamidyl, sulfamidyl, cycloalkyl, cycloalkenyl, halo, haloalkyl, alkoxy, haloalkoxy, alkylthio, haloalkylthio, pentafluorosulfanyl, hydroxyalkyl, trialkylsilyl, alkynyl, and alkenyl.

When any variable (e.g., R$^1$, Z, etc.) occurs more than one time in any constituent, its definition on each occurrence is independent at every other occurrence. Also, combinations of substituents and variables are permissible only if such combinations result in stable compounds. Lines drawn into the ring systems from substituents indicate that the indicated bond may be attached to any of the substitutable ring atoms. If the ring system is polycyclic, it is intended that the bond be attached to any of the suitable carbon atoms on the proximal ring only. It is understood that substituents and substitution patterns on the compounds of the instant invention can be selected by one of ordinary skill in the art to provide compounds that are chemically stable and that can be readily synthesized by techniques known in the art, as well as those methods set forth below, from readily available starting materials.

The chromene compounds of Formula (I) may be prepared by using the following reactions besides the methods which have been published in articles or well validated in the experimental procedures. Therefore, the synthetic solutions below are just illustrative and not intended to limit the compounds or any specific substituent. The number of the substituents in the solution does not need to comply with the number specified in the Claims. Furthermore, for clarity, the compounds of Formulae (I) or (II) showing a single substitution may allow compounds with multiple substituents.

In one embodiment, chromenes of Formula (I) may be made by reaction of salicylic aldehydes (made from corresponding phenols; see WO2013/189121, CN 102757417; CN 103044477; and CN 103012350, each of which is incorporated by reference) with ethyl 4,4,4-trifluorocrotonate according to procedures described in literature (i.e., U.S. Pat. No. 6,034,256) for when Z=—CF$_3$, or with ethyl 4,4,5,5,5-pentafluorobut-2-enoate (CAS # [37759-78-7]) for when Z=—CF$_2$CF$_3$. Alternatively, chiral chromene acids, where Z=—CF$_3$, are made by reaction of salicylic aldehydes with 4,4,4-trifluorocrotonaldehyde and chiral catalyst followed by oxidation according to procedures described in ACS Med. Chem. Lett. 2014, 5, 1162-1166. Chiral chromene acids, where Z=—CF$_2$CF$_3$, are made by an analogous approach using 4,4,5,5,5-pentafluoropent-2-enal, which is made from 4,4,5,5,5-pentafluoropent-2-en-1-ol using the same procedure to make 4,4,4-trifluorocrotonaldehyde (INT-03) outlined below.

In various embodiments, the compounds of Formula (I) have at least one deuterated substituent such as, for example, deuteroalkyl, deuterocycloalkyl, and deuteron. In an embodiment, at least one of R$^1$, R$^2$, R$^3$, and R$^4$ is deuteroalkyl, deuterocycloalkyl, or deuteron. In some embodiments, the chromene compounds of the combination have the structure as shown in Formula (II), or pharmaceutically acceptable salts or stereoisomers thereof, or prodrug molecules thereof:

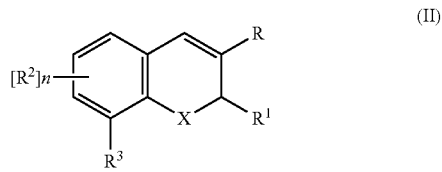

(II)

wherein X is selected from O, S, and NR$^a$;
R$^a$ is selected from H, C$_1$-C$_3$ alkyl, C$_3$-C$_6$ cycloalkyl, C$_1$-C$_3$ alkyl substituted by one or two halogens, and aryl;
R is selected from carboxyl, acylamino, alkylsulfonyl, C$_1$-C$_3$ cyclocarbonyl, aryl-substituted C$_1$-C$_3$ cyclocarbonyl and C$_1$-C$_3$ alkoxycarbony, and alkoxycarbonyl;
R$^1$ is selected from haloalkyl, alkyl, aralkyl, phenyl, and cycloalkyl;
R$^2$ is selected from one or more of the following groups: hydrogen, deuterium, halo, alkyl, deuteroalkyl, aralkyl, deuteroaralkyl, alkoxy, deuteroalkoxy, aryloxy, deuteroaryloxy, heteroaryloxy, deuteroheteroaryloxy, arylalkoxy, deuteroarylalkoxy, heteroarylalkoxy, deuteroheteroarylalkoxy, haloalkoxy, deuterohaloalkoxy, haloalkoxy, deuterohaloalkoxy, amino, deuteroamino, sulfamidyl, pentafluorosulfanyl, and deuterosulfamidyl; and
n is an integer selected from the group consisting of 1, 2, and 3.
R$^3$ is deuteroalkyl.

Specific embodiments of the chromene compounds of Formula (I) include:

TABLE 1

Deuterated Compounds

| Compound No. | Structure | Name |
|---|---|---|
| A01 | ![Br-chromene-CO2H structure with CD3 and CF3] | (S)-6-bromo-8-trideuteromethyl-2-(trifluoromethyl)-2H-chromene-3-carboxylic acid |

TABLE 1-continued

Deuterated Compounds

| Compound No. | Structure | Name |
|---|---|---|
| A02 | [structure: 6-Cl, 8-CD3, 2-CF3 chromene-3-CO2H] | (S)-6-chloro-8-trideuteromethyl-2-(trifluoromethyl)-2H-chromene-3-carboxylic acid |
| A03 | [structure: 6-OCF3, 8-CD2CD3, 2-CF3 chromene-3-CO2H] | (S)-8-pentadeuteroethyl-6-(trifluoromethoxy)-2-(trifluoromethyl)-2H-chromene-3-carboxylic acid |
| A04 | [structure: 6-CD3, 8-CD3, 2-CF3 chromene-3-CO2H] | (S)-6,8-di-trideuteromethyl-2-(trifluoromethyl)-2H-chromene-3-carboxylic acid |
| A05 | [structure: 6-Cl, 5-CD3, 7-CD3, 2-CF3 chromene-3-CO2H] | (S)-6-chloro-5,7-di-trideuteromethyl-2-(trifluoromethyl)-2H-chromene-3-carboxylic acid |
| A06 | [structure: 6-Br, 5-CD3, 7-CD3, 2-CF3 chromene-3-CO2H] | (S)-6-bromo-5,7-di-trideuteromethyl-2-(trifluoromethyl)-2H-chromene-3-carboxylic acid |
| A07 | [structure: 6-CD3, 2-CF3 chromene-3-CO2H] | (S)-6-trideuteromethyl-2-(trifluoromethyl)-2H-chromene-3-carboxylic acid |
| A08 | [structure: 6-CD3, 8-Cl, 2-CF3 chromene-3-CO2H] | (S)-8-chloro-6-trideuteromethyl-2-(trifluoromethyl)-2H-chromene-3-carboxylic acid |
| A09 | [structure: 6-SF5, 8-CD3, 2-CF3 chromene-3-CO2H] | (S)-8-trideuteromethyl-6-(pentafluorosulfanyl)-2-(trifluoromethyl)-2H-chromene-3-carboxylic acid |
| A10 | [structure: 6-OCF3, 8-CD3, 2-CF3 chromene-3-COOH] | (S)-8-trideuteromethyl-6-(trifluoromethoxy)-2-(trifluoromethyl)-2H-chromene-3-carboxylic acid |

TABLE 2

| | Non-Deuterated Compounds | |
|---|---|---|
| Compound No. | Structure | Name |
| B01 | | (S)-6,8-dichloro-2-(trifluoromethyl)-2H-chromene-3-carboxylic acid |
| B02 | | (S)-6-chloro-8-methyl-2-(trifluoromethyl)-2H-chromene-3-carboxylic acid |
| B03 | | (S)-6-bromo-8-methyl-2-(trifluoromethyl)-2H-chromene-3-carboxylic acid |
| B04 | | (S)-6,8-dimethyl-2-(trifluoromethyl)-2H-chromene-3-carboxylic acid |
| B05 | | (S)-8-methyl-6-(trifluoromethoxy)-2-(trifluoromethyl)-2H-chromene-3-carboxylic acid |
| B06 | | (S)-8-ethyl-6-(trifluoromethoxy)-2-(trifluoromethyl)-2H-chromene-3-carboxylic acid |
| B07 | | (S)-6-chloro-5,7-dimethyl-2-(trifluoromethyl)-2H-chromene-3-carboxylic acid |

TABLE 2-continued

Non-Deuterated Compounds

| Compound No. | Structure | Name |
|---|---|---|
| B08 | | (S)-7-(tert-butyl)-6-chloro-2-(trifluoromethyl)-2H-chromene-3-carboxylic acid |
| B09 | | (S)-6-pentafluorosulfanyl-2-(trifluoromethyl)-2H-chromene-3-carboxylic acid |
| B10 | | (S)-6-pentafluorosulfanyl-8-methyl-2-(trifluoromethyl)-2H-chromene-3-carboxylic acid |
| B11 | | (S)-6-pentafluorosulfanyl-8-ethyl-2-(trifluoromethyl)-2H-chromene-3-carboxylic acid |

In another embodiment, the chromene compound of Formula (II):

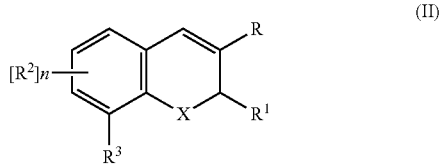

(II)

wherein X is O, $R^a$ is selected from the group consisting of H, $C_1$-$C_3$ alkyl, $C_3$-$C_6$ cycloalkyl, $C_1$-$C_3$ alkyl substituted with one or two halo, and aryl; n is an integer selected from the group consisting of 1, 2, and 3; R is selected from the group consisting of carboxyl and alkoxycarbonyl; $R^1$ is selected from the group consisting of haloalkyl, alkyl, aralkyl, and cycloalkyl; each $R^2$ is independently selected from the group consisting of deuterium, halogen, alkyl, deuteroalkyl, aralkyl, deuteroaralkyl, haloalkyl, deuterohaloalkyl, alkoxy, deuteroalkoxy, aryloxy, deuteroaryloxy, heteroaryloxy, deutero-heteroaryloxy, arylalkoxy, deutero-arylalkoxy, heteroarylalkoxy, deutero-heteroarylalkoxy, haloalkoxy, deutero-haloalkoxy, amino, deuteroamino, sulfamidyl, and deuterosulfamidyl; and $R^3$ is deuteroalkyl. In another embodiment, position 7 is unsubstituted; R is carboxyl or $C_1$-$C_3$ alkoxycarbonyl; $R^1$ is haloalkyl; and combinations thereof. In another embodiment, n is 1 or 2; R is carboxyl or $C_1$-$C_3$ alkoxycarbonyl; $R^1$ is haloalkyl, cycloalkyl, or phenyl; $R^2$ is deuterium, halogen, alkyl, deuteroalkyl, haloalkyl, deuterohaloalkyl, alkoxy, deuteroalkoxy, alkylamino, deuteroalkylamino, alkylated sulfamidyl, and alkylated deuterosulfamidyl; or combinations thereof, and at least one of the $R^2$ substitutions is at position 6.

C. Second Compounds

The chromene compound of Formula (I) is combined with a second compound. The second compound is a small molecule, drug, peptide, antibody, or pharmaceutical agent. In one embodiment, the second compound may a PD-1 inhibitor, a PD-L1 inhibitor, a CTLA-4 inhibitor, an OX-40 agonist, a CD137 agonist, a LAG-3 inhibitor, an IDO inhibitor, a bi-specific protein, an EGFR inhibitor, a HER2 inhibitor, or an immune stimulating therapy.

In an embodiment, the second compound is a PD-1 inhibitor. A PD-1 inhibitor is an immune checkpoint modulator, which acts upon the immune checkpoint protein, programmed cell death protein 1, also known as cluster of differentiation 279 (CD279). PD-1 exists on immune cells and normally acts as an "off-switch" that prevents the T cell from activating. This inhibiting function is activated when PD-1 binds PD-L1, which exists on many tumors. In some embodiments, the PD-1 inhibitor is selected from the group consisting of nivolumab, pidilizumab, pembrolizumab, AMP-224 (CAS #1422184-00-6), AMP-514 (MEDI0680, CAS #1642374-69-3), STI-A1110, TSR-043, and AUNP-12 (AUR-012, Aurigene-012, Aurigene NP-12).

In an embodiment, the second compound is a PD-L1 inhibitor. A PD-L1 inhibitor is an immune checkpoint modulator, which acts upon the immune checkpoint protein, programmed death-ligand 1, also known as cluster of differentiation 274 (CD274) or B7 homolog 1 (B7-H1). High expression of PD-L1 has been shown to correlate with increased tumor aggressiveness and lower survival, as upregulation of PD-L1 in tumors may allow tumors to evade the immune system. This occurs through binding of PD-L1 to PD-1, which the PD-L1 inhibitor prevents by binding to PD-L1. In some embodiments, the PD-L1 inhibitor is selected from the group consisting of RG 7446, BMS-936559 (MDX 1105, CAS #1422185-22-5), MSB0010718C, STI-A1010, avelumab, atezolizumab, and durvalumab.

In an embodiment, the second compound is a CTLA-4 inhibitor. A CTLA-4 inhibitor is an immune checkpoint modulator, which acts upon the immune checkpoint protein, cytotoxic T-lymphocyte-associated protein 4, also known as cluster of differentiation 152 (CD152). CTLA-4 checkpoint proteins are expressed in activated T cells and in Tregs, and binding of CTLA-4 to CD80 or CD86 inhibits immune function. CTLA-4 may act by outcompeting CD28, or preventing CD28 from binding CD80 or CD86 which causes an immune stimulatory effect. CTLA-4 may act by capturing and removing CD80 and CD86 from antigen presenting cells. In some embodiments, the CTLA-4 inhibitor is selected from the group consisting of ipilimumab and tremelimumab.

In an embodiment, the second compound is an OX-40 agonist. An OX-40 agonist is an immune checkpoint modulator, which acts upon the immune checkpoint protein, tumor necrosis factor receptor superfamily member 4 (TNFRSF4), also known as cluster of differentiation 134 (CD134) and OX-40. OX-40 is a secondary co-stimulatory immune checkpoint protein, expressed 24 to 72 hours following immune activation. Due to the binding of OX-40L to OX-40 receptors on T cells, preventing T cell death and increasing cytokine production, OX-40 plays a critical role in the maintenance of an immune response beyond the first few days and onwards to a memory response. In some embodiments, the OX40 agonist is selected from the group consisting of anti-OX40, TIM3 antibody, and Immutune IMP701.

In an embodiment, the second compound is a CD137 agonist. A CD137 agonist is an immune checkpoint modulator and includes any compound, including but not limited to antibodies and small molecules, which binds to the CD137 protein. CD137 is also known as tumor necrosis factor receptor superfamily member 9 (TNFRSF9), 4-1BB and induced by lymphocyte activation (ILA), which causes stimulation of the immune system. CD137 can be expressed by activated T cells, but to a larger extent on CD8 than on CD4 T cells. In addition, CD137 expression is found on dendritic cells, B cells, follicular dendritic cells, natural killer cells, granulocytes and cells of blood vessel walls at sites of inflammation. In some embodiments, the CD137 agonist is selected from the group consisting of urelumab and utomilumab.

In an embodiment, the second compound is a LAG-3 inhibitor. A LAG-3 inhibitor is an immune checkpoint modulator and includes any compound, including but not limited to antibodies and small molecules that bind to the LAG-3 protein and prevent its inhibitory effects on the immune system. LAG-3s main ligand is MHC class II, to which it binds with higher affinity than CD4. The protein negatively regulates cellular proliferation, activation, and homeostasis of T cells, in a similar fashion to CTLA-4 and PD-1, and has been reported to play a role in Treg suppressive function. LAG-3 also helps maintain $CD8^+$ T cells in a tolerogenic state and, working with PD-1, helps maintain CD8 exhaustion during chronic viral infection. In some embodiments, the LAG-3 inhibitor is BMS-986016 (CAS #1683572-29-3).

In an embodiment, the second compound is an IDO inhibitor. An IDO inhibitor is an immune checkpoint modulator and includes any compound, including but not limited to antibodies and small molecules, that binds to the indoleamine 2,3-dioxygenase and prevents it from sending inhibitory signals to the immune system. IDO may permit tumor cells to escape the immune system by depletion of L-Trp in the microenvironment of cells. A wide range of human cancers, such as prostatic, colorectal, pancreatic, cervical, gastric, ovarian, head, lung, etc., overexpress human IDO (hIDO). In some embodiments, the IDO inhibitor is selected from the group consisting of GDC-0919 (CAS #1402836-58-1), indoximod, 1-methyl-D-tryptophan (NSC-721782), NLG919 (CAS #1402836-58-1) epacadostat, and norharmane.

In an embodiment, the second compound is a bi-specific protein that contains at least two domains to bind at least two targets in order to decrease proximity or provoke biological reactions or both. In another embodiment, the action of the bi-specific protein causes an increased immune response by stimulating a response or preventing inhibitory effects or both. Bi-specific proteins may bind epitopes on an immune cell, including but not limited to a T cell or a natural killer (NK) cell, and on a tumor cell. The action of a bi-specific protein may cause an increase in immune response due to the proximity of the immune cell to the tumor cell. The action of a bi-specific protein may also cause an immune response due to inhibition of an inhibitory checkpoint protein or other immune inhibitory signal. The action of a bi-specific protein may also cause an immune response due to activation of a signal that causes increased activity of an immune cell In some embodiments, the bi-specific protein is selected from the group consisting of ALT-801 (CAS #1188450-53-4) and MEDI-565 (AMG 211, BUB-024, CAS #1419574-83-6).

In an embodiment, the second compound is a EGFR inhibitor. An EGFR inhibitor is a compound that prevents the activation, upregulation or overexpression of EGFR, which can be accomplished through multiple pathways. A compound which has effects on other proteins and also prevents activation, upregulation, or overexpression of EGFR is considered an EGFR inhibitor. EGFR upregulation or overexpression is caused by genetic mutations, which produce uncontrolled cell division. EGFR upregulation or overexpression has been associated with a number of cancers including but not limited to squamous cell carcinoma of the lung, anal cancers, glioblastoma, and epithelial tumors of the head and neck. In some embodiments, the EGFR inhibitor is selected from the group consisting of brigatinib, gefitinib, icotinib, neratinib, afatinib, dacomitinib, cetuximab, erlotinib, flavopiridol, zalutumumab, necitumumab, lidocaine, matuzumab, osimertinib, panitumumab, PD168393 (CAS #194423-15-9), lapatinib, vandetanib, rindopepimut, canertinib, HuMAX-EGFR, and CimaVax-EGF.

In an embodiment, the second compound is a HER2 inhibitor. HER2 is also known as CD340, ERBB2, or HER2/neu. HER2 is an oncogene which can activate multiple cellular pathways, including the MAPK, PI3K/Akt, phospholipase C, PKC, and STAT pathways. Signaling through the HER2 protein promotes cell proliferation and inhibits apoptosis. Inhibiting HER2 would decrease proliferation and increase apoptosis. HER2 inhibitors include small molecules, HER2 antagonists, inhibitory peptides, and anti-HER2 antibodies. In some embodiments, the HER2 inhibitor is selected from the group consisting of ado-trastuzumab emtansine, trastuzumab, and pertuzumab.

In an embodiment, the second compound is an immune stimulating therapy. Immune stimulating therapies are any compounds, such as antibodies, small molecules, biologics, or polysaccharides that modulate the action of the immune system acting as a stimulator of stimulatory pathways or an inhibitor of inhibitory pathways, which may be distinct from the molecules and classes of molecules described previously. The mechanism of action of these therapies can include action as an agonist, antagonist, allosteric effector, enzyme or any action resulting in increased efficacy of the immune system against cancer. The immune stimulating therapy may inhibit B7-H3, inhibit-NKG2A, bind to phosphatidylserine, bind to CD27 to stimulate immune response against, antagonize the adenosine A2 receptor, or work by an unknown mechanism. In some embodiments, the immune stimulating therapy is selected from the group consisting of vidapenant, varlilumab, monalizumab, KAHR-102, BGB324 (R-428, CAS #1037624-75-1), enoblituzumab, lirilumab, bavituximab, pidilizumab, BL-8040 (CAS #664334-36-5), GDC-0919 (NLG-919, RG607, CAS #1402836-58-1), IGN-311 (CAS #1354846-06-2), elotuzumab, blinatumomab, samalizumab, plerixafor, ganitumab, pexodartinib, trabedersen, and galunisertib.

D. Combinations

The chromene compound of Formula (I) as described herein is used in combination with a second compound known to be useful in the treatment or amelioration of similar diseases, such as cancer. In the combined administration, the second compound may be administered, by a route of administration and in a dose commonly used, contemporaneously or sequentially with the compound of Formula (I). The chromene compound may be administered before or after the second compound. When the chromene compound of Formula (I) is used contemporaneously with the second compound, a pharmaceutical composition comprising the chromene compound of Formula (I), a second compound and, optionally, one or more additional drugs may be used. The combined therapy also includes therapies in which the chromene compound of Formula (I) and the second compound are administered on overlapping schedules. The chromene compound of Formula (I) may be used in a lower dose when combined with the second compound than when the compound of Formula (I) is used alone.

In an embodiment, a chromene compound of Formula (I) is combined with a PD-1 inhibitor. In another embodiment, a chromene compound of Formula (I) is deuterated and combined with an inhibitor of PD-1. In yet another embodiment, one or more of Compounds A01-A10 are combined with a PD-1 inhibitor. In another embodiment, the PD-1 inhibitor combined with the deuterated chromene compound of Formula (I) is nivolumab, pidilizumab, pembrolizumab, AMP-224, AMP-514, STI-A1110, TSR-043, AMP-514, or AUNP-12

In another embodiment, a chromene compound of Formula (I) is non-deuterated and combined with an inhibitor of PD-1. In yet another embodiment, one or more of Compounds B01-B11 are combined with a PD-1 inhibitor. In another embodiment, the PD-1 inhibitor combined with a deuterated chromene compound of Formula (I) is nivolumab, pidilizumab, pembrolizumab, AMP-224, AMP-514, STI-A1110, TSR-043, AMP-514, or AUNP-12.

In an embodiment, a chromene compound of Formula (I) is combined with a PD-L1 inhibitor. In another embodiment, a chromene compound of Formula (I) is deuterated and combined with an inhibitor of PD-L1. In yet another embodiment, one or more of Compounds A01-A10 are combined with a PD-L1 inhibitor. In another embodiment, the PD-L1 inhibitor combined with a deuterated chromene compound of Formula (I) is RG 7446, BMS-936559, MSB0010718C, STI-A1010, avelumab, atezolizumab, or durvalumab.

In another embodiment, a chromene compound of Formula (I) is non-deuterated and combined with an inhibitor of PD-L1. In yet another embodiment, one or more of Compounds B01-611 are combined with a PD-L1 inhibitor. In another embodiment, the PD-L1 inhibitor combined with a deuterated chromene compound of Formula (I) is RG 7446, BMS-936559, MSB0010718C, STI-A1010, avelumab, atezolizumab, or durvalumab.

In an embodiment, a chromene compound of Formula (I) is combined with a CTLA-4 inhibitor. In another embodiment, a chromene compound of Formula (I) is deuterated and combined with an inhibitor of CTLA-4. In yet another embodiment, one or more of Compounds A01-A10 are combined with a CTLA-4 inhibitor. In another embodiment, the CTLA-4 inhibitor combined with a deuterated chromene compound of Formula (I) is ipilimumab or tremelimumab.

In another embodiment, a chromene compound of Formula (I) is non-deuterated and combined with an inhibitor of CTLA-4. In yet another embodiment, one or more of Compounds B01-611 are combined with a CTLA-4 inhibitor. In another embodiment, the CTLA-4 inhibitor combined with a deuterated chromene compound of Formula (I) is ipilimumab or tremelimumab.

In an embodiment, a chromene compound of Formula (I) is combined with an OX-40 agonist. In another embodiment, a chromene compound of Formula (I) is deuterated and combined with an OX-40 agonist. In yet another embodiment, one or more of Compounds A01-A10 are combined with an OX-40 agonist. In another embodiment, the OX-40 agonist combined with a deuterated chromene compound of Formula (I) is anti-OX40, TIM3 antibody, or Immutune IMP701.

In another embodiment, a chromene compound of Formula (I) is non-deuterated and combined with an OX-40 agonist. In yet another embodiment, one or more of Compounds B01-B11 are combined with an OX-40 agonist. In another embodiment, the OX-40 agonist combined with a deuterated chromene compound of Formula (I) is anti-OX40, TIM3 antibody, or Immutune IMP701.

In an embodiment, a chromene compound of Formula (I) is combined with a CD137 agonist. In another embodiment, a chromene compound of Formula (I) is deuterated and combined with a CD137 agonist. In yet another embodiment, one or more of Compounds A01-A10 are combined with a CD137 agonist. In another embodiment, the CD137 agonist combined with a deuterated chromene compound of Formula (I) is urelumab or utomilumab.

In another embodiment, a chromene compound of Formula (I) is non-deuterated and combined with a CD137 agonist. In yet another embodiment, one or more of Compounds B01-B11 are combined with a CD137 agonist. In another embodiment, the CD137 agonist combined with a deuterated chromene compound of Formula (I) is urelumab or utomilumab.

In an embodiment, a chromene compound of Formula (I) is combined with a LAG-3 inhibitor. In another embodiment, a chromene compound of Formula (I) is deuterated and combined with an inhibitor of LAG-3. In yet another embodiment, one or more of Compounds A01-A10 are combined with a LAG-3 inhibitor. In another embodiment, the LAG-3 inhibitor combined with a deuterated chromene compound of Formula (I) is BMS-986016.

In another embodiment, a chromene compound of Formula (I) is non-deuterated and combined with an inhibitor of LAG-3. In yet another embodiment, one or more of Compounds B01-B11 are combined with a LAG-3 inhibitor. In another embodiment, the LAG-3 inhibitor combined with a deuterated chromene compound of Formula (I) is BMS-986016.

In an embodiment, a chromene compound of Formula (I) is combined with an IDO inhibitor. In another embodiment, a chromene compound of Formula (I) is deuterated and combined with an inhibitor of IDO. In yet another embodiment, one or more of Compounds A01-A10 are combined with a IDO inhibitor. In another embodiment, the IDO inhibitor combined with a deuterated chromene compound of Formula (I) is GDC-0919, indoximod, 1-methyl-D-tryptophan, NLG919, epacadostat, or norharmane.

In another embodiment, a chromene compound of Formula (I) is non-deuterated and combined with an inhibitor of IDO. In yet another embodiment, one or more of Compounds B01-B11 are combined with a IDO inhibitor. In another embodiment, the IDO inhibitor combined with a deuterated chromene compound of Formula (I) is GDC-0919, indoximod, 1-methyl-D-tryptophan, NLG919, epacadostat, or norharmane.

In an embodiment, a chromene compound of Formula (I) is combined with a bi-specific protein. In another embodiment, a chromene compound of Formula (I) is deuterated and combined with a bi-specific protein. In yet another embodiment, one or more of Compounds A01-A10 are combined with a bi-specific protein. In another embodiment, the bi-specific protein combined with a deuterated chromene compound of Formula (I) is ALT-801 or MEDI-565.

In another embodiment, a chromene compound of Formula (I) is non-deuterated and combined with a bi-specific protein. In yet another embodiment, one or more of Compounds B01-611 are combined with a bi-specific protein. In another embodiment, the bi-specific protein combined with a deuterated chromene compound of Formula (I) is ALT-801 or MEDI-565.

In an embodiment, a chromene compound of Formula (I) is combined with an EGFR inhibitor. In another embodiment, a chromene compound of Formula (I) is deuterated and combined with an inhibitor of EGFR. In yet another embodiment, one or more of Compounds A01-A10 are combined with an EGFR inhibitor. In another embodiment, the EGFR inhibitor combined with a deuterated chromene compound of Formula (I) is brigatinib, gefitinib, icotinib, neratinib, afatinib, dacomitinib, cetuximab, erlotinib, flavopiridol, zalutumumab, necitumumab, lidocaine, matuzumab, osimertinib, panitumumab, PD168393, lapatinib, vandetanib, rindopepimut, canertinib, HuMAX-EGFR, or CimaVax-EGF.

In another embodiment, a chromene compound of Formula (I) is non-deuterated and combined with an inhibitor of EGFR. In yet another embodiment, one or more of Compounds B01-B11 are combined with an EGFR inhibitor. In another embodiment, the EGFR inhibitor combined with a deuterated chromene compound of Formula (I) is brigatinib, gefitinib, icotinib, neratinib, afatinib, dacomitinib, cetuximab, erlotinib, flavopiridol, zalutumumab, necitumumab, lidocaine, matuzumab, osimertinib, panitumumab, PD168393, lapatinib, vandetanib, rindopepimut, canertinib, HuMAX-EGFR, or CimaVax-EGF.

In an embodiment, a chromene compound of Formula (I) is combined with an HER2 inhibitor. In another embodiment, a chromene compound of Formula (I) is deuterated and combined with an inhibitor of HER2. In yet another embodiment, one or more of Compounds A01-A10 are combined with an HER2 inhibitor. In another embodiment, the HER2 inhibitor combined with a deuterated chromene compound of Formula (I) is ado-trastuzumab emtansine, trastuzumab, or pertuzumab.

In another embodiment, a chromene compound of Formula (I) is non-deuterated and combined with an inhibitor of HER2. In yet another embodiment, one or more of Compounds B01-B11 are combined with an HER2 inhibitor. In another embodiment, the HER2 inhibitor combined with a deuterated chromene compound of Formula (I) is ado-trastuzumab emtansine, trastuzumab, or pertuzumab.

In an embodiment, a chromene compound of Formula (I) is combined with an immune stimulating therapy. In another embodiment, a chromene compound of Formula (I) is deuterated and are combined with an immune stimulating therapy. In yet another embodiment, one or more of Compounds A01-A10 are combined with an immune stimulating therapy. In another embodiment, the immune stimulating therapy is combined with a deuterated chromene compound of Formula (I) is vidapenant, varlilumab, monalizumab, KAHR-102, BGB324, enoblituzumab, lirilumab, bavituximab, pidilizumab, BL-8040, GDC-0919, IGN-311, elotuzumab, blinatumomab, samalizumab, plerixafor, ganitumab, pexodartinib, trabedersen, and galunisertib.

In another embodiment, a chromene compound of Formula (I) is non-deuterated and combined with an immune stimulating therapy. In yet another embodiment, one or more of Compounds B01-B11 are combined with an immune stimulating therapy. In another embodiment, an immune stimulating therapy is combined with a deuterated chromene compound of Formula (I) is vidapenant, varlilumab, monalizumab, KAHR-102, BGB324, enoblituzumab, lirilumab, bavituximab, pidilizumab, BL-8040, GDC-0919, IGN-311, elotuzumab, blinatumomab, samalizumab, plerixafor, ganitumab, pexodartinib, trabedersen, and galunisertib.

In a particular embodiment, compound A01 is combined with one of erlotinib, pembrolizumab, nivolumab, atezolizumab, ipilimumab, avelumab, druvalumab, trastuzumab, cetuximab, pertuzumab, or panitumumab. In a specific embodiment, compound A01 is combined with erlotinib.

The combination in the present application may be used with other traditional anti-inflammatory drugs both available or under development, for example, drugs such as steroid anti-inflammatory drugs, non-steroid anti-inflammatory drugs, iNOS inhibitors, LTB4 receptor stimulants and LTA4 hydrolase inhibitors, to enhance the anti-inflammatory and analgesic effects, or, may be used with antibiotics, alkylated drugs, antimetabolites, hormone drugs, immuno drugs, interferon drugs and some other combinations of drugs to enhance the treatment or inhibition effects to tumors.

E. Administration and Dose Ranges

Based on the standard pharmaceutical technology, the compound of Formula (I), second compound, and combinations thereof of the present disclosure may be administrated alone or in pharmaceutical combinations with pharmaceutically acceptable excipients to mammals, such as human beings, for example, by oral, subcutaneous, intraperitoneal, intravenous, rectal, topical, ocular, pulmonary, nasal and parenteral administration.

In one embodiment, the chromene compound of Formula (I) in the combination of the present disclosure is present at a therapeutically effective dose. In one embodiment, the therapeutically effective dose is an amount sufficient to cause at least a 70% reduction in urinary PGE-M, when compared to healthy control or a baseline standard. Urinary PGE-M can be determined by conventional means, such as via enzyme-linked immunosorbent assay (ELISA) or mass spectrometry. A healthy control may be a subject who does not suffer from cancer. A baseline standard may be obtained by determining urinary PGE-M in a patient prior to initiation of treatment with the combination of a chromene compound of formula (I) and a second compound. US 2012/0016002 describes methods for determining urinary PGE-M in a subject and is incorporated by reference in its entirety.

In one embodiment, the dose of the chromene compound of Formula (I) is between about 0.1 and about 100 mg/kg/day. The dose may be administered in a single daily dose or in two, three, four or more times a day, or in sustained release forms.

In an embodiment, the amount of the second compound is present in a therapeutically effective amount. In another embodiment, the therapeutically effective amount of the second compound is between about 0.01 and about 250 mg/kg/day. In another embodiment, the therapeutically effective amount of the second compound is less when administered in combination with a compound of Formula (I) than when administered alone. Particular therapeutically effective amounts of the second compounds are disclosed in Table 3.

TABLE 3

Therapeutically effective dose of second compound

| Second compound | Therapeutically effective amount |
| --- | --- |
| Trastuzumab | 3.6 mg/kg Q3W |
| Afatinib | 20-40 mg QD |
| ALT-801 | 0.01-0.1 mg/kg/dose, |
| AMG 211 | 200-12,800 µg/day |
| AMP-224 | 10-30 mg/kg Q2W |
| Atezolizumab | 1200 mg Q3W |
| Avelumab | 10-20 mg/kg Q2W |
| Bavituximab | 0.1-3 mg/kg QW or Q4W |
| Blinatumomab | 1 µg/day for week 1 |
|  | 28 µg/day weeks 2-4; |
| BGB324 | 100-300 mg QD |
| BL-8040 | 2 mg/kg QD |
| Cetuximab | 400 mg/m$^2$/120 minutes loading |
|  | 250 mg/m$^2$/60 minutes weekly |
| Erlotinib | 50-150 mg QD |
| Galunisertib | 300 mg/day |
| Necitumumab | 800 mg/day |
| Ipilimumab | 3 mg/kg Q3W |
| Lapatinib | 1250 mg QD |
| Nivolumab | 240 mg or 3 mg/kg Q2W |
| Osimertinib | 80 mg QD |
| Panitumumab | 6 mg/kg Q2W |
| Pembrolizumab | 2 mg/kg or 200 mg Q3W |
| Pertuzumab | 840 mg initial |
|  | 420 mg subsequent Q3W |
| Trabedersen | 140 mg/m$^2$/day |
| Urelumab | 0.1 mg/kg Q3W |
| Vandetanib | 200-300 mg QD |
| Varlilumab | 0.1-10 mg/kg |
| Brigatinib | 180 mg QD |

TABLE 3-continued

Therapeutically effective dose of second compound

| Second compound | Therapeutically effective amount |
| --- | --- |
| Dacomitinib | 45 mg QD |
| Gefitinib | 250 mg QD |
| Icotinib | 125 or 375 mg Q8 hours |
| Neratinib | 240 mg QD |

F. Cancer Therapy

The combination of the present disclosure is useful for treating cancers. In an embodiment, a method for treating cancer comprises administering to a subject in need thereof a therapeutically effective amount of the combination of the chromene compound of Formula (I) and a second compound as described herein. In a particular embodiment, the cancer is selected from the group consisting of melanoma, non-small cell lung cancer, colorectal cancer, head and neck cancer, renal cell carcinoma, lymphoma, urothelial carcinoma, Merkel cell carcinoma, pancreatic cancer, breast cancer, gastric cancer, cancer of the bowels, endometrium cancer, hepatobiliary tract cancer, urinary tract cancer, brain cancer, skin cancers, glioblastoma, prostate cancer, and ovarian cancer. In particular embodiments, the cancer is colorectal, gastric, non-small cell lung, breast, pancreatic, prostate, or head and neck squamous cell carcinomas.

In another embodiment, the method further comprises determining the expression of major histocompatibility complex (MHC) class I in the cancer of said subject and administering the combination of the chromene compound of Formula (I) and a second compound when the cancer shows a positive expression of MHC Class I. MHC Class I expression may be categorized as high, low, or negative, with high and low expression being considered "positive" MHC Class I expression. MHC Class I expression may be quantified by immunohistochemical (IHC) analysis or other clinical assays. "High" and "low" expression may be determined by one of ordinary skill in the art. Soluble MHC class I polypeptide-related sequence A (sMICA), sMICB, soluble UL16-binding protein (sULBP)-1, sULBP-2, sULBP-3, and sULBP-4 are measured using a custom multiplex bead array (R&D Systems). Bead-based assays are analyzed using the Luminex-based Bio-Plex system (BIO-RAD). See Koguchi et. al. *Cancer Res.* 2015, for further information on methods to determine levels of soluble MHC class I polypeptide-related chain A (sMICA). Existence of expression of MHC class I proteins as determined through standard methods by a person skilled in the art, e.g., a clinical pathologist, is a predictive indicator of positive response to the claimed combination therapies. See Simpson et. al. Gut 2010.

In another embodiment, the method further comprises determining expression of PD-L1 in the cancer of said subject and administering the combination of the chromene compound of Formula (I) and a second compound to the subject when the cancer shows a positive expression of PD-L1. PD-L1 may be determined by means conventional in the art, such as an IHC assay. In an embodiment, tumors may be considered positive for PD-L1 expression if 50% or more of the tumor cells stain for PD-L1.

In another embodiment, the method further comprises determining the level of intratumoral T cells in the cancer of said subject and administering the combination of the chromene compound of Formula (I) and a second compound to the subject when the cancer shows an elevated level of intratumoral T cells. According to Simpson et. al., Gut 2010, in colorectal cancer, greater than 15 T cells/mm$^2$ is considered a high or elevated level of intratumoral T cells as assessed by standard methods of IHC staining. According to Dieci *Annals of Oncology* 2015, in breast cancer, cases were defined as elevated or containing high intratumoral T cells, also known as, tumor-infiltrating lymphocytes (TILs), if greater than or equal to 50% of intratumoral T cells (It-TILs) or stromal T cells (Str-TILs) according to the method disclosed in Salgado et. al. *Ann Oncol* (2015).

In another embodiment, the method further comprises determining the level of urinary PGE-M in a subject and administering the combination of the chromene compound of Formula (I) and a second compound to the subject when the urinary PGE-M level is elevated. Urinary PGE-M level is considered "elevated" when it is at least 1.5 times the upper limit of normal (ULN). For men, an elevated urinary PGE-M level would would be >15 ng/mg creatinine (ULN is 10 ng/mg creatinine). For women, an elevated urinary PGE-M level would be >9 ng/mg creatinine (ULN is 6 ng/mg creatinine). In a further embodiment, the urinary PGE-M level is measured in a subject with cancer selected from colorectal cancer, non-small cell lung cancer, breast cancer, gastric cancer, pancreatic cancer, prostate cancer, or head and neck squamous cell carcinoma. In yet another embodiment, the colorectal cancer, non-small cell lung cancer, breast cancer, gastric cancer, pancreatic cancer, prostate cancer, or head and neck squamous cell carcinoma is in Stage III or Stage IV.

In another embodiment, the method further comprises determining the level of microsatellite instability (MSI) in a subject and administering a combination of chromene compound of Formula (I) and a second compound when the MSI is high, low, or stable. MSI may be determined by means conventional in the art, such as via a PCR-based assay for particular DNA repeats or an IHC assay of mismatch repair (MMR) proteins (see for example, Vilar et al., *Nat. Rev. Clin. Oncol,* 2010; Bupathi, et al. *J. Gastrointest. Oncol,* 2016; Dudley, et al., *Clin Cancer Res.* 2016; Sinicrope, et al., *Clin. Gastroenterol. Hepatol.,* 2016; and Kautto, et al., *Oncotarget,* 2016). In an embodiment, a high level of MSI may be defined as instability at two or more loci, or >30% of loci in larger panel of markers; a low level of MSI may be defined as instability at one locus, or when 10-30% of loci in larger panels; and microsatellite stability may be defined as no instability at any loci, or <10% of loci in larger panels. In a further embodiment, the method further comprises determining the microsatellite instability when the cancer is colorectal cancer, gastric cancer, endometrium cancer, ovarian cancer, hepatobiliary tract cancer, urinary tract cancer, brain cancer, or skin cancers.

In another embodiment, the method further comprises determining the ratio of CD8$^+$/FOXP3 expressing cells according to standard flow cytometry methods and administering a combination of chromene compound of Formula (I) and a second compound when the CD8$^+$/FOXP3 ratio is >1 as this is reported to predict superior clinical outcome in ovarian cancer and urothelial cancer. Preston et. al. *PLoS One.* 2013 and Baras et. al., *Oncoimmunology* 2016.

In a particular embodiment, a method for treating lung cancer comprises administration of a combination of Compound A01 and erlotinib.

In a particular embodiment, a method for treating colorectal cancer comprises administration of a combination of Compound A01 and pembrolizumab.

In a particular embodiment, a method for treating melanoma comprises administration of a combination of Compound A01 and pembrolizumab.

In a particular embodiment, a method for treating colorectal cancer comprises administration of a combination of Compound A01 and atezolizumab.

In a particular embodiment, a method for treating lung cancer comprises administration of a combination of Compound A01 and atezolizumab.

G. Pharmaceutical Compositions

The pharmaceutical compositions containing the chromene compound of Formula (I), the second compound, or combinations thereof, may be in a form suitable for oral administration, for example, tablets, lozenges, aqueous or oily suspensions, dispersible powders or granules, emulsions, hard or soft capsules, or syrups or elixirs. Compositions intended for oral administration may be prepared according to any method known in the art of the manufacture of pharmaceutical compositions, and such compositions may contain one or more excipients or agents selected from the group consisting of sweetening agents, flavoring agents, coloring agents and preserving agents in order to provide pharmaceutically elegant and palatable preparations. Tablets contain the active ingredient in admixture with non-toxic pharmaceutically acceptable excipients which are suitable for the manufacture of tablets. These excipients may be, for example, inert diluents, such as calcium carbonate, sodium carbonate, lactose, calcium phosphate or sodium phosphate; granulating and disintegrating agents, for example, microcrystalline cellulose, sodium crosscarmellose, corn starch, or alginic acid; binding agents, for example starch, gelatin, polyvinyl-pyrrolidone or acacia, and lubricating agents, for example, magnesium stearate, stearic acid or talc. The tablets may be uncoated or they may be coated by known techniques to mask the unpleasant taste of the drug or delay disintegration and absorption in the gastrointestinal tract and thereby provide a sustained action over a longer period. For example, a water soluble taste masking material such as hydroxypropyl-methylcellulose or hydroxypropylcellulose, or a time delay material such as ethyl cellulose or cellulose acetate butyrate may be employed.

The dose of tablets may be 0.1 mg/tab, 0.2 mg/tab, 0.25 mg/tab, 0.5 mg/tab, 1 mg/tab, 2 mg/tab, 5 mg/tab, 10 mg/tab, 25 mg/tab, 50 mg/tab, 100 mg/tab and 250 mg/tab. The dose of other forms, such as capsulates, may be referenced similarly.

Formulations for oral use may also be presented as hard gelatin capsules where the active ingredients are mixed with inert solid diluents, for example, calcium carbonate, calcium phosphate or kaolin, or, as soft gelatin capsules where the active ingredients are mixed with water soluble carriers such as polyethyleneglycol or an oil medium, for example peanut oil, liquid paraffin or olive oil.

Aqueous suspensions contain active materials in admixture with excipients suitable for the manufacture of aqueous suspensions. Such excipients include suspending agents, for example sodium carboxymethylcellulose, methylcellulose, hydroxypropylmethyl-cellulose, sodium alginate, polyvinyl-pyrrolidone, gum tragacanth and gum acacia; dispersing or wetting agents may be a naturally-occurring phosphatide, for example lecithin, or condensation products of an alkylene oxide with fatty acids, for example polyoxyethylene stearate, or condensation products of ethylene oxide with long chain aliphatic alcohols, for example heptadecaethyleneoxycetanol, or condensation products of ethylene oxide with partial esters derived from fatty acids and a hexitol such as polyoxyethylene sorbitol monooleate, or condensation products of ethylene oxide with partial esters derived from fatty acids and hexitol anhydrides, for example polyethylene sorbitan monooleate. The aqueous suspensions may also contain one or more preservatives, for example ethyl, or n-propyl p-hydroxybenzoate, one or more coloring agents, one or more flavoring agents, and one or more sweetening agents such as sucrose, saccharin, or aspartame.

Oily suspensions may be formulated by suspending the active ingredients in a vegetable oil, for example arachis oil, olive oil, sesame oil or coconut oil, or in mineral oil such as liquid paraffin. The oily suspensions may contain thickening agents, for example beeswax, hard paraffin, or cetyl alcohol. Sweetening agents such as those set forth above and flavoring agents may be added to provide a palatable oral preparation. These compositions may be preserved by the addition of an anti-oxidant such as butylated hydroxyanisol or alpha-tocopherol.

Dispersible powders and granules suitable for preparation of an aqueous suspension by the addition of water provide the active ingredients in admixture with dispersing or wetting agent, suspending agent and one or more preservatives. Suitable dispersing or wetting agents and suspending agents have been exemplified by those already mentioned above. Additional excipients, for example sweetening, flavoring and coloring agents, may also be present. These compositions may be preserved by the addition of an anti-oxidant such as ascorbic acid.

The pharmaceutical compositions of the present disclosure may also be in a form of oil-in-water emulsions. The oily phase may be a vegetable oil, for example olive oil or arachis oil, or a mineral oil, for example liquid paraffin or mixtures of these. Suitable emulsifying agents may be naturally occurring phosphatides, for example soy bean lecithin, and esters or partial esters derived from fatty acids and hexitol anhydrides, for example sorbitan monooleate, and condensation products of the said partial esters with ethylene oxide, for example polyoxyethylene sorbitan monooleate. The emulsions may also contain sweetening agents, flavoring agents, preservatives and antioxidants.

Syrups and elixirs may be formulated with sweetening agents, for example glycerol, propylene glycol, sorbitol or sucrose. Such formulations may also contain demulcents, preservatives, flavoring agents, coloring agents and antioxidants.

The pharmaceutical compositions may be in a form of sterile injectable aqueous solutions. Among the acceptable carriers and solvents that may be employed are water, Ringers solution and isotonic sodium chloride solution.

The sterile injectable preparation may also be a sterile injectable oil-in-water microemulsion where the active ingredients are dissolved in the oily phase. For example, the active ingredients may be first dissolved in a mixture of soybean oil and lecithin. The oil solution is then introduced into a water and glycerol mixture and processed to form microemulations.

The injectable solutions or microemulsions may be introduced into a patient blood stream by local bolus injection. Alternatively, it may be advantageous to administer the solution or microemulsion in such a way as to maintain a constant circulating concentration of the instant compound. In order to maintain such a constant concentration, a continuous intravenous delivery device may be utilized. An embodiment of such a device is the Deltec CADD-PLUS™ model 5400 intravenous pump.

The pharmaceutical compositions may be in a form of a sterile injectable aqueous or oleagenous suspension for intramuscular and subcutaneous administration. This suspension may be formulated according to the known art using those suitable dispersing or wetting agents and suspending agents which have been mentioned above. The sterile injectable preparation may also be a sterile injectable solution or suspension in a non-toxic parenterally acceptable diluent or solvent, for example as a solution in 1,3-butane diol. In addition, nonvolatile oils are conventionally employed as a solvent or suspending medium. For this purpose, any bland nonvolatile oil may be employed including synthetic mono- or diglycerides. In addition, fatty acids such as oleic acid find use in the preparation of injectables.

Chromene compound of Formula (I), second compounds, or combinations thereof, may also be administered in the form of suppositories for rectal administration of the drug. These compositions may be prepared by mixing the drug with a suitable non-irritating excipient which is solid at normal temperature but liquid at the rectal temperature and will therefore melt in the rectum to release the drug. Such materials include cocoa butter, glycerinated gelatin, hydrogenated vegetable oils, mixtures of polyethylene glycols of various molecular weights and fatty acid esters of polyethylene glycol.

For topical use, creams, ointments, jellies, solutions or suspensions, etc., containing the chromene compound of Formula (I), second compound, or combinations thereof are employed. (For purposes of this application, topical application shall include mouth washes and gargles.)

The chromene compound of Formula (I), second compound, and combinations thereof of the present disclosure may be administered in intranasal form via topical use of suitable intranasal carriers and delivery devices, or via transdermal routes, using those forms of transdermal skin patches well known to those of ordinary skill in the art. To be administered in the form of a transdermal delivery system, the dose administration will, of course, be continuous rather than intermittent throughout the dose regimen. The compounds and combinations of the present disclosure may also be delivered as a suppository employing bases such as cocoa butter, glycerinated gelatin, hydrogenated vegetable oils, mixtures of polyethylene glycols of various molecular weights and fatty acid esters of polyethylene glycol.

When the compounds of the present disclosure are administered to a human subject, the daily dose will normally be determined by the prescribing physician with the dose generally varying according to the age, weight, sex and response of the individual patient, as well as the severity of the patients symptoms.

H. Metabolites and Prodrugs

The combinations of the present disclosure also include combinations of metabolites and/or prodrugs of the chromene compounds of Formula (I), and the second compounds. In an embodiment, the combination comprises a metabolite or prodrug of a chromene compound and a second compound. In another embodiment, the combination comprises a chromene compound and a metabolite or prodrug of a second compound. In yet another embodiment, the combination comprises a metabolite or prodrug of a chromene compound and a metabolite or prodrug of a second compound.

EXAMPLES

Example 1: Anti-Tumor Effect of Combination in Colon Cell Carcinoma

This study evaluated the effect of (S)-6-bromo-8-trideuteromethyl-2-(trifluoromethyl)-2H-chromene-3-carboxylic acid (Compound A01), a selective cyclooxygenase 2 (COX-2) inhibitor, in combination with erlotinib on tumor growth in a HT-29 xenograft murine colon carcinoma model.

HT-29 cells were cultured in medium for one week. Following digestion cells were centrifuged for 3-5 minutes at 800-1500 rpm. Cells were washed with PBS and centrifuged again under the same condition. Cells were then suspended in PBS to a final concentration of $12.5 \times 10^7$ cells/mL. 200 μL of the HT-29 cell suspension were subcutaneously injected into the mice left forelimb axillary ($2.5 \times 10^6$ HT-29 cells per mouse).

48 CB17SCID male mice were implanted with $2.5 \times 10^6$ HT29 cells. Growth of the tumor was calculated for each animal using a caliper and the equation: $V = \pi \times a b^2 / 6$. Once tumors reached approximately 75 mm³ in size mice were randomly assigned to one of 6 treatment groups: vehicle, 1 mg/kg Compound A01, 1 mg/kg Compound A01+50 mg/kg erlotinib, 10 mg/kg Compound A01, 10 mg/kg Compound A01+50 mg/kg erlotinib, 50 mg/kg erlotinib. Compound A01 was dissolved in 2% DMSO, 4% ethanol, 4% castor oil, and 90% ddH$_2$O.

Compound A01 and erlotinib were administered daily by oral gavage, beginning immediately following randomization and continued for 22 days. Mouse weight and tumor volume measurements were taken on days 0, 3, 6, 9, 12, 15, 18, 21, and 22 following randomization. On day 24 tumor tissue was collected from each animal to determine Compound A01, erlotinib, and PGE2 levels.

All animals developed tumors. There was no difference between treatment groups in body weights over the course of the study (Table 6)

TABLE 6

| | Body weight (g) | | | | | | | | |
|---|---|---|---|---|---|---|---|---|---|
| | Day 0 | Day 3 | Day 6 | Day 9 | Day 12 | Day 15 | Day 18 | Day 21 | Day 22 |
| Vehicle | 23.4 ± 0.4 | 22.9 ± 0.4 | 21.9 ± 1.4 | 21.9 ± 1.4 | 21.8 ± 1.6 | 21.1 ± 1.5 | 20.6 ± 1.4 | 20.7 ± 1.8 | 21.1 ± 1.9 |
| Comp. A01 1 mg/kg | 23.4 ± 0.4 | 22.4 ± 0.5 | 21.6 ± 1.2 | 20.7 ± 1.1 | 21.7 ± 1.3 | 20.0 ± 1.1 | 19.9 ± 1.0 | 19.9 ± 0.9 | 20.0 ± 1.2 |
| Comp. A01 10 mg/kg | 23.5 ± 0.7 | 22.7 ± 0.5 | 22.0 ± 1.0 | 21.2 ± 1.1 | 20.8 ± 1.2 | 21.4 ± 1.3 | 21.4 ± 1.5 | 21.4 ± 1.5 | 21.7 ± 1.3 |
| Comp. A01 1 mg/kg + erlotinib 50 mg/kg | 23.2 ± 1.2 | 22.9 ± 1.3 | 22.3 ± 1.7 | 21.5 ± 1.9 | 20.8 ± 2.1 | 19.5 ± 2.0 | 20.6 ± 1.9 | 20.7 ± 1.7 | 20.6 ± 1.7 |
| Comp. A01 10 mg/kg + erlotinib 50 mg/kg | 23.8 ± 0.3 | 22.7 ± 0.5 | 22.0 ± 1.0 | 21.7 ± 0.6 | 21.2 ± 1.1 | 20.8 ± 1.2 | 21.4 ± 1.3 | 21.4 ± 1.5 | 21.7 ± 1.3 |
| Erlotinib 50 mg/kg | 22.4 ± 1.2 | 22.4 ± 0.8 | 22.3 ± 1.1 | 20.6 ± 0.8 | 20.6 ± 1.5 | 20.5 ± 1.5 | 20.7 ± 1.3 | 21.0 ± 0.9 | 21.2 ± 0.9 |

The combination of 1 mg/kg Compound A01+50 mg/kg erlotinib slowed tumor growth by 66%, when compared to vehicle-treated mice. The combination of 10 mg/kg Compound A01+50 mg/kg erlotinib slowed tumor growth by a 60% when compared to vehicle-treated mice. 10 mg/kg Compound A01 produced 51% suppression of tumor growth alone compared to vehicle, whereas erlotinib alone produced a 38% suppression of tumor growth alone when compared to vehicle (Table 7, FIG. 1).

TABLE 7

| | Tumor volume by treatment group (mm³) | | | | | | | | |
|---|---|---|---|---|---|---|---|---|---|
| | Day 0 | Day 3 | Day 6 | Day 9 | Day 12 | Day 15 | Day 18 | Day 21 | Day 22 |
| Vehicle | 73.0 ± 9.4 | 173.3 ± 54.5 | 214.3 ± 95.0 | 380.4 ± 122.4 | 476.3 ± 147.4 | 648.7 ± 182.7 | 926.9 ± 200.5 | 1163.1 ± 315.9 | 1255.9 ± 383.9 |
| Cmpd A01 1 mg/kg | 71.8 ± 9.1 | 143.8 ± 25.4 | 194.2 ± 33.2 | 301.1 ± 135.6 | 344.8 ± 71.9 | 459.4 ± 60.4 | 820.6 ± 151.9 | 899.0 ± 224.9 | 921.1 ± 286.5 |
| Cmpd A01 10 mg/kg | 70.1 ± 10.4 | 145.2 ± 42.5 | 186.9 ± 44.1 | 235.1 ± 71.8 | 292.1 ± 79.8 | 309.7 ± 74.6 | 497.5 ± 143.7 | 592.1 ± 92.8 | 612.1 ± 112.1 |
| Cmpd A01 1 mg/kg + erlotinib 50 mg/kg | 71.8 ± 10.4 | 142.0 ± 22.2 | 159.2 ± 28.0 | 215.0 ± 51.6 | 241.1 ± 76.7 | 304.4 ± 39.8 | 429.7 ± 120.2 | 476.4 ± 133.8 | 497.7 ± 162.5 |
| Cmpd A01 10 mg/kg + erlotinib 50 mg/kg | 70.1 ± 15.5 | 143.7 ± 27.6 | 155.5 ± 39.6 | 210.1 ± 67.8 | 215.7 ± 69.6 | 249.1 ± 64.1 | 395.5 ± 115.4 | 414.6 ± 151.4 | 432.7 ± 195.1 |
| Erlotinib 50 mg/kg | 73.7 ± 4.3 | 156.9 ± 32.9 | 192.0 ± 56.8 | 241.0 ± 107.5 | 299.1 ± 70.8 | 394.5 ± 98.5 | 641.1 ± 210.5 | 691.4 ± 200.4 | 774.8 ± 294.2 |

Oral dosing of erlotinib influenced plasma concentration of Compound A01 at 2 and 6 hours post dosing (Table 8)

TABLE 8

Plasma concentration of Compound A01 and erlotinib (mean ± SD, μg/L)

| Treatment Group | Compound A01 2 hours post dosing | Compound A01 6 hours post dosing |
|---|---|---|
| Vehicle | 0 | 0 |
| Compound A01 1 mg/kg | 3613.75 ± 1348.90 | 2253.75 ± 529.07 |
| Compound A01 1 mg/kg + Erlotinib 50 mg/kg | 2871.25 ± 670.57 | 3275 ± 868.48 |
| Compound A01 10 mg/kg | 28437.5 ± 6016.14 | 19134.38 ± 5165.73 |
| Compound A01 10 mg/kg + Erlotinib-50 mg/kg | 27968.75 ± 8782.44 | 24471.88 ± 8974.32 |

| Treatment Group | Erlotinib | Erlotinib |
|---|---|---|
| Vehicle | 0 | 0 |
| Erlotinib 50 mg/kg | 3340 ± 1591.89 | 1263.3 ± 520.46 |
| Compound A01 1 mg/kg + Erlotinib-50 mg/kg | 2525 ± 1202.16 | 3692.5 ± 1472.44 |
| Compound A01 10 mg/kg + Erlotinib 50 mg/kg | 2185.63 ± 1182.86 | 1951.25 ± 1039.99 |

The addition of erlotinib increased in the intratumor level of Compound A01 by 1.5 fold when compared to the amount of intratumor Compound A01 in the absence of erlotinib alone (Table 9)

TABLE 9

Intratumoral concentration of Compound A01 and Erlotinib (mean ± SD, ug/g)

| Treatment Group | Compound A01 | Erlotinib |
|---|---|---|
| Vehicle | 0 | 0 |
| Compound A01 1 mg/kg | 1478.5 ± 652.1 | |
| Compound A01 1 mg/kg + Erlotinib-50 mg/kg | 2243.5 ± 887.1 | 13225 ± 3017.7 |
| Compound A01 10 mg/kg | 9720 ± 2758.7 | |
| Compound A01 10 mg/kg + Erlotinib-50 mg/kg | 14745 ± 4758 | 7800 ± 3299 |
| Erlotinib-50 mg/kg | | <80 |

Compound A01 alone or in combination with erlotinib suppressed PGE2 levels in the tumor from 66-100% (Table 10).

TABLE 10

Intratumoral concentration of PGE2 (mean ± SD, ug/g)

| Treatment Group | PGE2 |
|---|---|
| Vehicle | 246.7 ± 104.3 |
| Compound A01 1 mg/kg | 14.01 ± 30.3 |
| Compound A01 1 mg/kg + Erlotinib-50 mg/kg | 85.3 ± 110.9 |
| Compound A01 10 mg/kg | 0 |
| Compound A01 10 mg/kg + Erlotinib-50 mg/kg | 12.8 ± 18.3 |
| Erlotinib-50 mg/kg | 160.6 ± 89.5 |

Compound A01 alone was superior to 50 mg/kg erlotinib in slowing tumor growth. However, the combination of Compound A01+erlotinib showed the greatest tumor growth suppression when compared to vehicle than each therapy alone. There was little difference between Compound A01 given at 1 or 10 mg/kg when combined with erlotinib.

Example 2: Anti-Tumor Effect of Combination in Colon Cell Carcinoma

This experiment evaluated Compound A01 in combination with erlotinib on tumor growth in a CT26 xenograft murine colon carcinoma model.

CT26.WT cells were cultured under standard conditions. They were harvested with trypsin and washed with PBS. $10^5$ cells were injected into the right flank of 6 week old female BALB/c mice in total volume of 100 μL. Tumor size was quantified as the mean of the longest diameter and its perpendicular. Mice received celecoxib, Compound A01, or vehicle (10% DMSO/50% PEG400/40% water) orally (per o.s.) daily from day 0. Anti-PD-1 monoclonal antibody (clone RMP1-14, BioXCell) was administered i.p. at 200 μg/mouse from day 5 to 9 (when the mean tumor diameter was about 5 mm) post-tumor cell inoculation, then every 3 to 4 days for a maximum of six injections.

Figure 2:
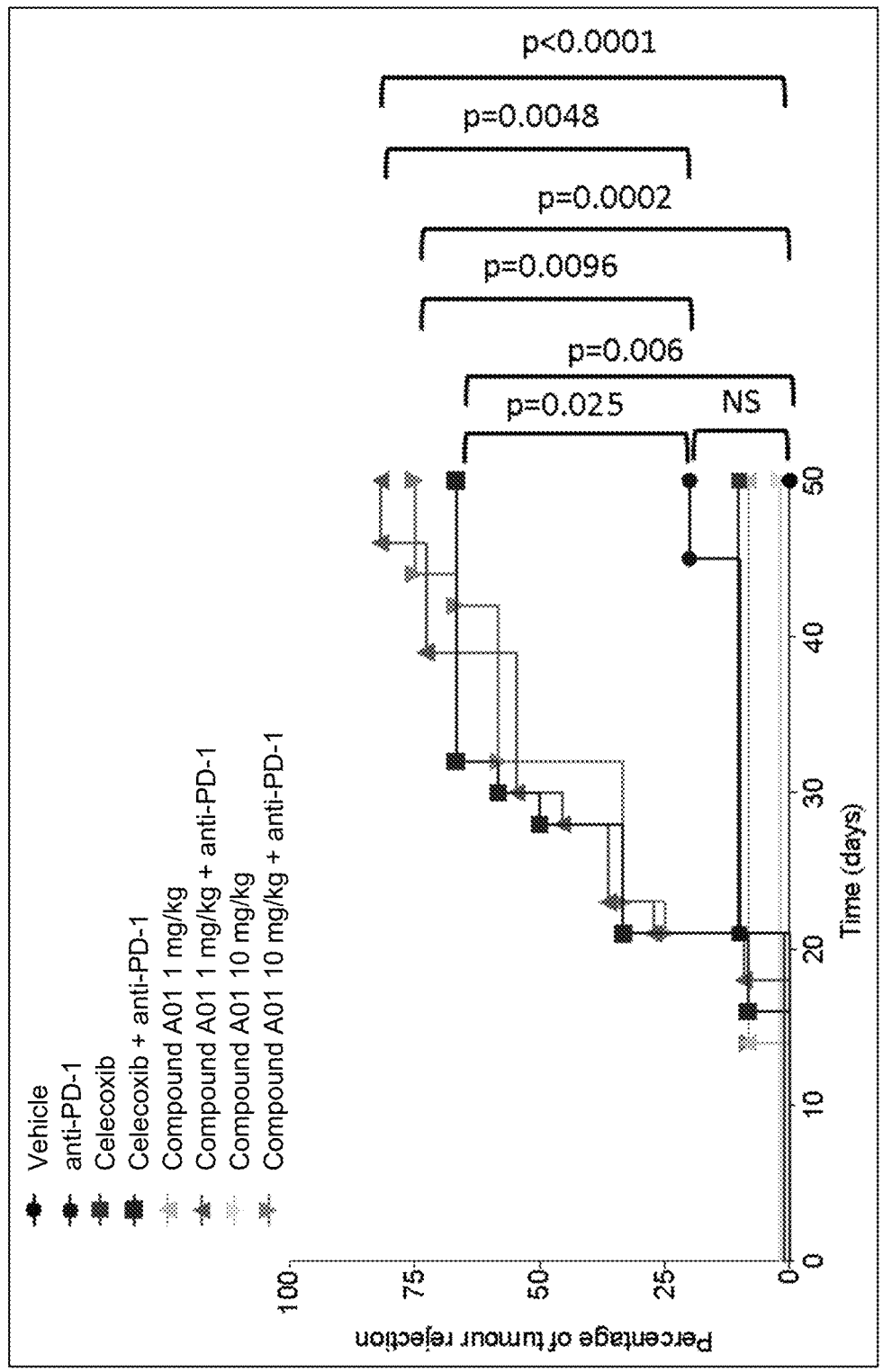
FIG. 2 shows the effect of Compound A01, an anti-PD1 antibody, or a combination thereof on tumor rejection in mice inoculated with colon carcinoma cells.

Mice receiving the combination therapy of a COX-2 inhibitor (compound A01 or celecoxib) and anti-PD1 antibody completely rejected the tumor up to 50 days following inoculation. In contrast, monotherapy (celecoxib, compound A01, or anti-PD1 antibody alone) did not prevent tumor growth (FIG. 2). None of the treatment regimens induced weight loss. Combination therapy reduced intratumoral levels of IL-6, IFN-γ, IL-1β, TNF-α, and PGE2 compared to vehicle treated mice.

Example 3: Effect of Combination on Immune Response to Colon Cell Carcinoma

Female BALB/c mice were inoculated with $10^5$ CT26 colorectal cancer cells as in Example 2. COX-2 inhibitors (celecoxib or Compound A01) or vehicle were administered daily per o.s. Anti-PD1 antibody was administered i.p. (200 μg/mouse) at days 9 and 14 post inoculation. Tumors were analyzed at day 16 (7 days after first anti-PD1 administration).

At Day 16, there were no differences in tumor size or weight among the groups. There was an increase in $CD45^+$ cells (leukocyte), $CD3^+$, $CD8^+$, $CD8^+IFN\gamma^+$, $CD4^+IFN\gamma^+$, $CD8^+TNF\alpha^+$, and $CD4^+TNF\alpha^+$ cell infiltration into the tumors with compound A01 monotherapy or combination therapy compared to vehicle treated mice. Administration of anti-PD1 antibody, either alone or in combination with a COX-2 inhibitor, increased the number of intratumoral $CD4^+Foxp3^+$ cells. Treatment of Compound A01 alone increased the ratio of $CD8^+$ T cells to $Foxp3^+$ T cells. Treatment of celecoxib alone did not increase the ratio of $CD8^+$ T cells to $Foxp3^+$ T cells. There was no obvious effect on $GR-1^+$ myeloid-derived suppressor cells (MDSCs). Combination therapy increased the number of splenic $CD4^+$ $IFN\gamma^+$ cells.

Example 4: Effect of Combination of Chromene and Anti-PD-L1 Antibody on Tumor Growth and Immune Response This experiment evaluated the effect on the immune response to treatment with Compound A01 alone and in combination with an anti-PD-L1 antibody in a murine model of colon carcinoma.

CT26 murine colon carcinoma cells were prepared as in Example 2. Female Envigo BALB/c (BALB/cAnNHsd) were inoculated with $5 \times 10^5$ CT26 cells suspended in PBS (200 μL) subcutaneously high in the axilla (just under the fore limb). The mice were divided into seven groups: Vehicle (Group 1), antibody control (rat IgG2b isotype) (Group 2), anti-mPD-L1 (clone 10F9G2) (Group 3), Compound A01 (Group 4), Compound A01+antibody control (Group 5), Compound A01+anti-mPD1-L1 (Group 6), and 1 mg/kg Compound A01+anti-mPD-L1 (Group 7). The antibodies were administered via i.p. injection on days 3, 6, 9, 12, and 16 following inoculation. Compound A01 was given per oral daily. The mice were euthanized two hours following final dose on Day 16 and samples were prepared for testing.

Treatment with Compound A01 slowed or anti-mPD-L1 slowed tumor growth compared to vehicle and isotype controls (all doses are 10 mg/kg except where indicated).

TABLE 11

Effect of Compound A01 and anti-mPD-L1 on tumor growth ($mm^3$)

| Treatment | Day 3 | Day 4 | Day 6 | Day 9 | Day 11 | Day 13 | Day 16 |
|---|---|---|---|---|---|---|---|
| Vehicle | 0 | 0 | 33 | 175 | 465 | 1007 | 2001 |
| Antibody control | 0 | 0 | 36 | 151 | 293 | 601 | 1297 |
| Anti-mPD-L1 | 0 | 0 | 33 | 172 | 287 | 623 | 849 |
| Compound A01 | 0 | 0 | 8 | 97 | 242 | 442 | 759 |
| Compound A01 + antibody control | 0 | 0 | 16 | 11 | 229 | 511 | 973 |
| Compound A01 + anti-mPD-L1 | 0 | 0 | 8 | 116 | 221 | 474 | 896 |
| Compound A01* + anti-mPD-L1 | 0 | 0 | 8 | 120 | 221 | 369 | 797 |

*1 mg/kg compound A01

Following euthanization, tumors were removed and processed to recover live cells. Red blood cells were removed. The cells were stained for surface markers and, where applicable, permeabilized for intracellular staining. The cells were washed and suspended in flow cytometry staining buffer and analyzed via flow cytometry.

Figure 3:
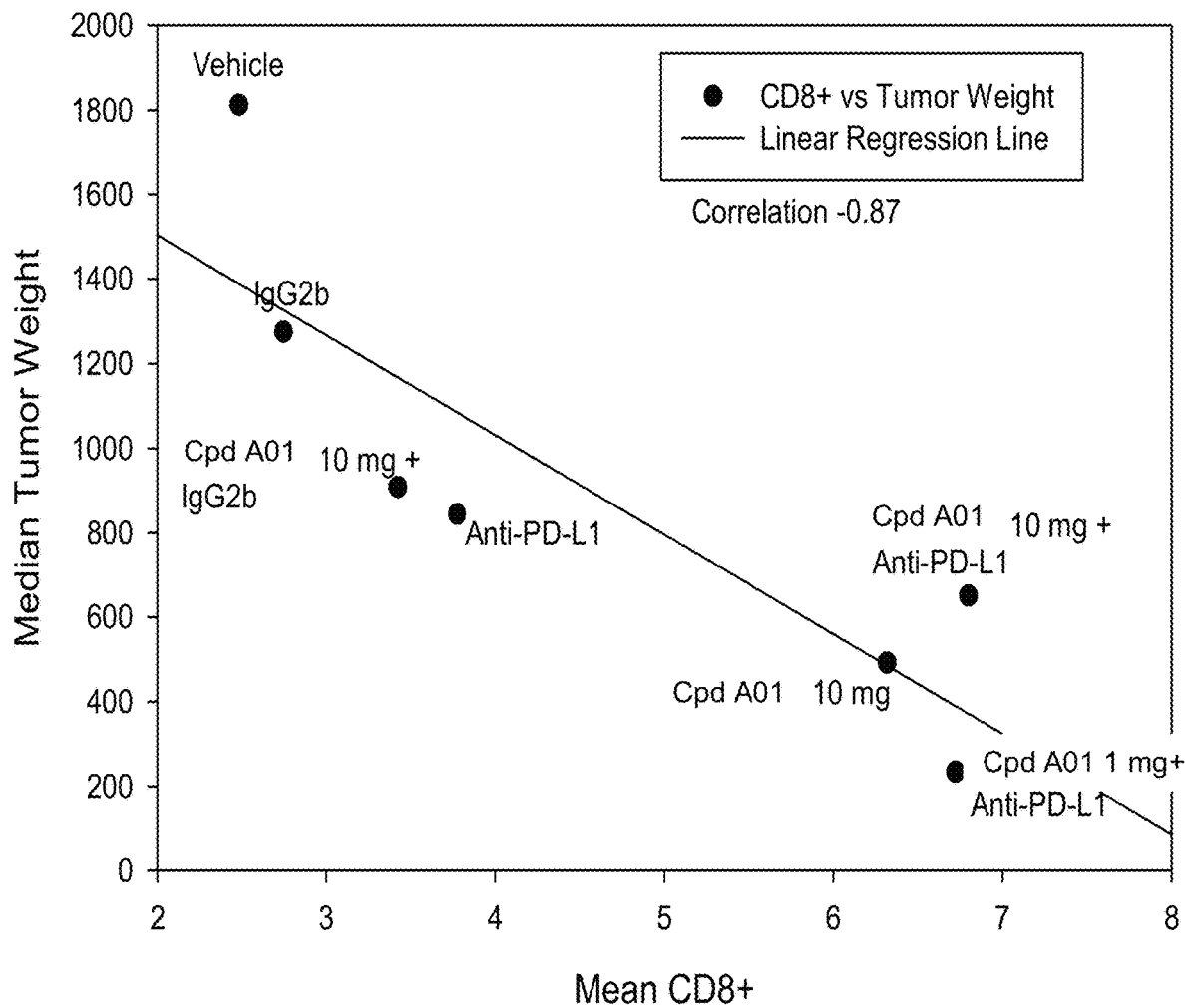
FIG. 3 shows the linear regression correlating an increase in $CD8^+$ T cells to a decrease in tumor volume.
Figure 4:
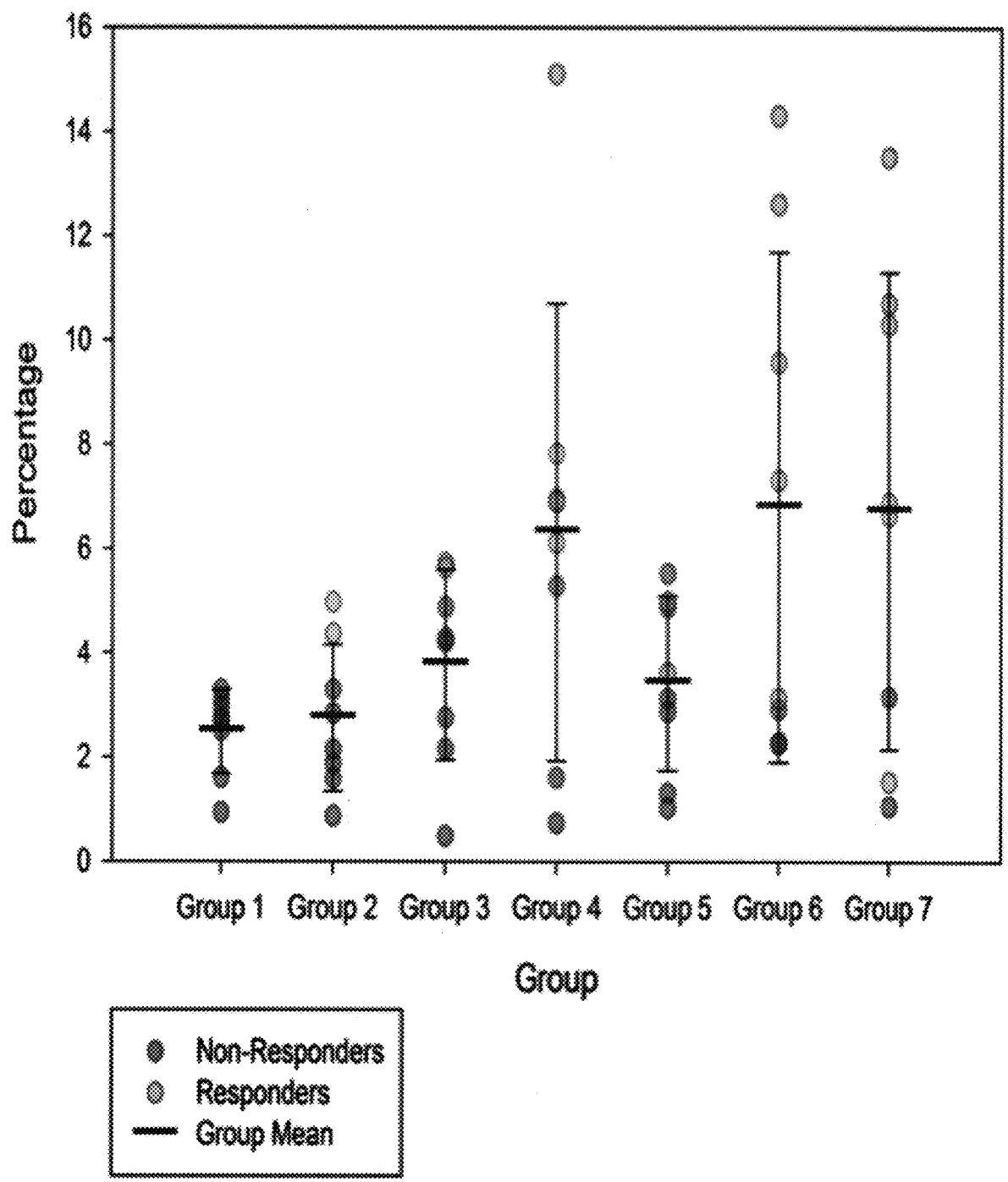
FIG. 4 shows the effect of Compound A01, an anti-PD1 antibody, or a combination thereof on $CD8^+$ T cell levels in colon carcinoma cells injected in mice.

Table 12 shows the effect of Compound A01 (10 mg/kg, unless otherwise indicated) and anti-mPD-L1 (10 mg/kg) on immune response. Compound A01, alone and in combination with anti-mPD-L1, increased the percentage of intratumoral $CD4^+CD8^-$ T cells (of total $CD45^+$ cells). Both Compound A01 and anti-mPD-L1 increased the percentage of intratumoral $CD8^+CD4^-$ T cells (of total $CD45^+$ cells). Compound A01 reduced the level of $Ki67^+CD8^+$ and $PD-1^+CD8^+$ T cells (of total $CD8^+CD4^-$ T cells). The treatment had minimal effect on the relative number of Tregs ($CD25^+$ $Foxp3^+$) and MDSCs ($CD11b^+Ly6G^+$) (as a percentage of total $CD45^+$ cells). The combination treatment increased the ratio of $CD8^+$ T cells to Tregs. FIG. 3 correlates $CD8^+$ cell percentages to tumor regression. FIG. 4 shows the statistical difference between $CD8^+$ groups.

TABLE 12

Effect of Compound A01 and anti-mPD-L1 on intratumoral immune response

| Treatment | $CD4^+$ $CD8^-$ | $CD8^+$ $CD4^-$ | $Ki67^+$ $CD8^+$ | $PD-1^+$ $CD8^+$ | Tregs | MDSCs |
|---|---|---|---|---|---|---|
| Vehicle | 0.80 | 2.49 | 19.79 | 83.09 | 1.90 | 9.47 |
| Antibody control | 0.86 | 2.75 | 15.64 | 81.39 | 2.08 | 10.43 |
| Anti-mPD-L1 | 0.87 | 3.77 | 13.02 | 74.55 | 2.17 | 10.92 |
| Compound A01 | 1.01 | 6.32 | 13.75 | 84.36 | 2.29 | 12.09 |
| Compound A01 + antibody control | 1.46 | 3.42 | 7.82 | 78.84 | 2.63 | 9.63 |
| Compound A01 + anti-mPD-L1 | 1.69 | 6.80 | 7.46 | 79.05 | 2.59 | 8.82 |

TABLE 12-continued

Effect of Compound A01 and anti-mPD-L1 on intratumoral immune response

| Treatment | $CD4^+$ $CD8^-$ | $CD8^+$ $CD4^-$ | $Ki67^+$ $CD8^+$ | $PD-1^+$ $CD8^+$ | Tregs | MDSCs |
|---|---|---|---|---|---|---|
| Compound A01* + anti-mPD-L1 | 1.60 | 6.72 | 7.92 | 74.28 | 2.48 | 9.60 |

*1 mg/kg compound A01

Example 5: Effect of Compound A01 on HT-29 Tumor Growth and Intratumoral PGE2

This study compared the effect of compound A01 and celecoxib on tumoral PGE-2 effect in a HT-29 xenograft murine colon carcinoma model.

HT-29 cells were prepared and implanted by standard methods using the same procedure as Example 1.

42 CB17SCID mice were implanted with $2.5 \times 10^6$ HT-29 cells. Once tumors reached 75 $mm^3$ in size, mice were randomly assigned one of six treatment groups: vehicle, 10 mg/kg celecoxib, 0.1 mg/kg Compound A01, 0.3 mg/kg Compound A01, 1 mg/kg Compound A01, 3 mg/kg Compound A01, 10 mg/kg Compound A01. Compound A01 was dissolved in 2% DMSO, 4% ethanol, 4% castor oil, and 90% $ddH_2O$ Compound A01 and celecoxib were administered daily by oral gavage, beginning immediately following randomization and continued for 22 days. Mouse weight and tumor volume measurements were taken on days 0, 3, 6, 9, 12, 15, 18, 21, and 22 following randomization. After 22 days dosing, the blood from each animal was collected at 2 hours and 6 hours post dose. The concentration of Compound A01 in the plasma was detected. On day 24 tumor tissue was collected from each animal to determine Compound A01, celecoxib, and PGE2 levels.

Table 13 shows the effect of 10 mg/kg celecoxib or various doses of Compound A01 on tumor volume. Table 14 shows the mean intratumoral PGE-2 plasma concentration following treatment with Compound A01 or celecoxib.

TABLE 13

Tumor Volume by Treatment Group (mm³)

| Treatment Group | Day 0 | Day 3 | Day 6 | Day 9 | Day 12 | Day 15 | Day 18 | Day 21 | Day 22 |
|---|---|---|---|---|---|---|---|---|---|
| Vehicle | 61.2 ± 12.3 | 92.9 ± 26.5 | 165.2 ± 77.9 | 293.8 ± 98.2 | 387.3 ± 216.0 | 418.01 ± 86.1 | 776.5 ± 307.3 | 1127.9 ± 413.3 | 1200.7 ± 377.2 |
| Celecoxib 10 mg/kg | 67.9 ± 10.3 | 81.8 ± 11.3 | 143.4 ± 34.6 | 244.5 ± 44.5 | 285.5 ± 73.9 | 380.9 ± 40.9 | 541.2 ± 123.4 | 736.1 ± 197.1 | 803.4 ± 214.2 |
| Comp. A01 0.1 mg/kg | 65.8 ± 11.0 | 88.5 ± 28.4 | 165.0 ± 50.2 | 283.1 ± 68.8 | 360.3 ± 103.1 | 416.8 ± 105.1 | 640.9 ± 171.9 | 900.4 ± 158.3 | 987.7 ± 198.4 |
| Comp. A01 0.3 mg/kg | 70.9 ± 8.6 | 83.8 ± 12.6 | 132.9 ± 44.0 | 231.5 ± 39.4 | 298.2 ± 85.9 | 350.7 ± 66.1 | 530.8 ± 194.4 | 723.5 ± 169.0 | 753.5 ± 302.4 |
| Comp. A01 1 mg/kg | 68.5 ± 14.5 | 85.2 ± 23.5 | 152.8 ± 44.3 | 239.8 ± 103.2 | 311.1 ± 45.7 | 364.8 ± 119.4 | 532.6 ± 144.4 | 730.9 ± 249.1 | 772.1 ± 128.8 |
| Comp. A01 3 mg/kg | 68.4 ± 11.1 | 80.3 ± 15.3 | 121.9 ± 21.8 | 190.1 ± 45.2 | 279.5 ± 55.5 | 329.1 ± 38.5 | 445.1 ± 66.5 | 622.8 ± 182.3 | 699.4 ± 225.8 |
| Comp. A01 10 mg/kg | 69.0 ± 11.9 | 83.9 ± 19.7 | 107.7 ± 43.9 | 176.0 ± 43.9 | 257.7 ± 82.4 | 332.0 ± 65.4 | 357.3 ± 65.4 | 453.6 ± 97.9 | 561.8 ± 148.7 |

TABLE 14

Tumoral PGE-2 plasma concentration by Treatment Group

| Treatment Group | Mean PGE-2 (ng/g) |
|---|---|
| Vehicle | 329.7 ± 252.4 |
| Celecoxib - 10 mg/kg | 233.3 ± 267.2 |
| Comp. A01 - 0.1 mg/kg | 203.9 ± 157.9 |
| Comp. A01 - 0.3 mg/kg | 237.3 ± 119.8 |
| Comp. A01 - 1 mg/kg | 90.7 ± 105.1 |
| Comp. A01 - 3 mg/kg | 94.3 ± 78.4 |
| Comp. A01 - 10 mg/kg | 45.5 ± 73.4 |

Example 6: Effect of Compound A01 on CT26 Tumor Growth and Intratumoral PGE2

This experiment evaluated the efficacy of Compound A01 compared celecoxib and their effects on prostaglandin E2 (PGE2) levels and T-cell inhibition in Balc/c female mice bearing CT26.WT murine colon carcinomas. In addition, analysis of Compound A01 concentrations in blood and tumors were performed.

CT26 murine colon carcinoma cells were prepared as in Example 2. Female Harlan Balb/c mice (BALB/cAnNHsd) were inoculated with $5 \times 10^5$ CT26 cells suspended in PBS (200 μL) subcutaneously high in the axilla (just under the fore limb). All mice were sorted into study groups based on caliper measurement estimation of tumor burden on Day 8 when the mean tumor burden for all animals was approximately 79 mm³ (range of group means, 75-83 mm³). Mice were divided into 10 groups: Vehicle Control (Group 1), 30 mg/kg Compound A01 (Group 2), 10 mg/kg Compound A01 (Group 3), 3 mg/kg Compound A01 (Group 4), 1 mg/kg Compound A01 (Group 5), 0.3 mg/kg Compound A01 (Group 6), 30 mg/kg celecoxib (Group 7), and 10 mg/kg celecoxib (Group 8).

Table 15 shows the effect of 10 mg/kg celecoxib or various doses of Compound A01 on tumor volume. Table 16 shows the mean intratumoral PGE-2 plasma concentration following treatment with Compound A01 or celecoxib.

TABLE 15

CT26 Tumor Volume by Treatment Group (mm³)

| Treatment Group | Day 8 | Day 10 | Day 13 | Day 15 | Day 17 |
|---|---|---|---|---|---|
| Vehicle (Group 1) | 82 ± 6 | 162 ± 18 | 371 ± 58 | 681 ± 84 | 1008 ± 122 |
| Compound A01 30 mg/kg (Group 2) | 78 ± 5 | 119 ± 8 | 309 ± 34 | 563 ± 89 | 897 ± 101 |
| Compound A01 10 mg/kg (Group 3) | 79 ± 6 | 121 ± 14 | 257 ± 35 | 590 ± 109 | 758 ± 130 |
| Compound A01 3 mg/kg (Group 4) | 83 ± 3 | 127 ± 11 | 314 ± 49 | 560 ± 79 | 834 ± 114 |
| Compound A01 1 mg/kg (Group 5) | 78 ± 5 | 118 ± 17 | 286 ± 48 | 433 ± 67 | 689 ± 114 |
| Compound A01 0.3 mg/kg (Group 6) | 80 ± 6 | 139 ± 15 | 460 ± 73 | 694 ± 116 | 1123 ± 198 |
| Celecoxib 30 mg/kg (Group 7) | 76 ± 5 | 131 ± 17 | 415 ± 66 | 685 ± 93 | 1046 ± 144 |
| Celecoxib 10 mg/kg (Group 8) | 79 ± 4 | 134 ± 11 | 369 ± 42 | 594 ± 84 | 904 ± 92 |

TABLE 16

CT26 Tumoral PGE-2 Plasma Concentration by Treatment Group (ng/g)

| Treatment Group | Mean PGE-2 Concentration | Standard Deviation |
|---|---|---|
| Vehicle (Group 1) | 1180 | 610 |
| Compound A01 30 mg/kg (Group 2) | 150 | 60 |
| Compound A01 1 mg/kg (Group 5) | 278 | 141 |
| Compound A01 0.3 mg/kg (Group 6) | 670 | 300 |
| Celecoxib 10 mg/kg (Group 8) | 1140 | 690 |

Example 7: Effect of Compound A01 and Anti-PD-L1 on CT26 Tumor Growth and Intratumoral PGE2

This experiment evaluates the effect on PGE-2 plasma concentration of treatment with Compound A01 alone or in combination with an anti-PD-L1 antibody in a murine model of colon carcinoma.

CT26 murine colon carcinoma cells are prepared as in Example 4. Female Envigo BALB/c (BALB/cAnNHsd) mice are inoculated with $5\times10^5$ CT26 cells as described in Example 4. The mice then are divided into control and treatment arms, where the treatment is with Compound A01 alone, or in combination with an anti-PD-L1 antibody. Tumor size and tumoral PGE-2 plasma concentration are determined.

The embodiments mentioned above are merely illustrative of aspects of the present disclosure. These embodiments shall not be regarded as any limitation to the present patent. It should be noted that, those skilled in the art may make various variations and improvements without departing from the concept of the present invention, and those variations and improvements shall fall into the protection cope of the present invention. Therefore, the protection scope of the present invention is subject to the claims.

All mentioned documents are incorporated by reference as if herein written. When introducing elements of the present disclosure or the exemplary embodiment(s) thereof, the articles "a," "an," "the" and "said" are intended to mean that there are one or more of the elements. The terms "comprising," "including" and "having" are intended to be inclusive and mean that there may be additional elements other than the listed elements. Although this invention has been described with respect to specific embodiments, the details of these embodiments are not to be construed as limitations.

What is claimed is:

1. A method for treating colorectal cancer, comprising administering to a subject in need thereof a therapeutically effective amount of:
   (S)-6-bromo-8-trideuteromethyl-2-(trifluoromethyl)-2H-chromene-3-carboxylic acid, or a pharmaceutically acceptable salt or solvate thereof; and
   a checkpoint modulator, wherein the checkpoint modulator is a PD-1 inhibitor selected from the group consisting of nivolumab, pidilizumab, pembrolizumab, AMP-224, AMP-514, STI-A1110, TSR-043, and AUNP-12.

2. The method of claim 1, wherein the (S)-6-bromo-8-trideuteromethyl-2-(trifluoromethyl)-2H-chromene-3-carboxylic acid, or a pharmaceutically acceptable salt or solvate thereof and the compound causes an at least 70% reduction in PGE-M in the urine.

3. The method of claim 1, further comprising determining expression of PD-L1 in the cancer in said subject.

4. The method of claim 1, further comprising determining the level of urinary PGE-M levels in the subject.

5. The method of claim 1, wherein the dose of the(S)-6-bromo-8-trideuteromethyl-2-(trifluoromethyl)-2H-chromene-3-carboxylic acid, or a pharmaceutically acceptable salt or solvate thereof is between about 0.1 and about 100 mg/kg/day, and the dose of the checkpoint modulator is between about 0.01 and about 250 mg/kg/day.

6. The method of claim 5, wherein the dose of the checkpoint modulator is reduced relative to when the checkpoint modulator is administered alone.

7. The method of claim 1, wherein the checkpoint modulator is pembrolizumab.

8. The method of claim 1 wherein the checkpoint modulator is pembrolizumab or nivolumab.

* * * * *